(12) United States Patent
Väin et al.

(10) Patent No.: US 10,343,286 B2
(45) Date of Patent: Jul. 9, 2019

(54) STORAGE SYSTEM, USE AND METHOD WITH ROBOTIC PARCEL RETRIEVAL AND LOADING ONTO A DELIVERY VEHICLE

(71) Applicant: Starship Technologies OÜ, Tallinn (EE)

(72) Inventors: Lauri Väin, Tallinn (EE); Viljar Valdek, Keila (EE); Märt Liivik, Lääne-Virumaa (EE); Henri Lend, Tallinn (EE); Tiit Liivik, Tallinn (EE); Henrik Herranen, Tallinn (EE); Ahti Heinla, Tallinn (EE); Veigo Evard, Tallinn (EE); Tommy Biene, Raplamaa (EE)

(73) Assignee: Starship Technologies OÜ, Tallinn (EE)

( * ) Notice: Subject to any disclaimer, the term of this patent is extended or adjusted under 35 U.S.C. 154(b) by 0 days.

(21) Appl. No.: 15/828,722

(22) Filed: Dec. 1, 2017

(65) Prior Publication Data

US 2019/0168392 A1  Jun. 6, 2019

(51) Int. Cl.
*B65G 1/04* (2006.01)
*B25J 11/00* (2006.01)
(Continued)

(52) U.S. Cl.
CPC .......... *B25J 11/008* (2013.01); *G06Q 10/087* (2013.01); *G06Q 10/08355* (2013.01);
(Continued)

(58) Field of Classification Search
CPC ................................ B65G 1/0492; B65G 1/04
See application file for complete search history.

(56) References Cited

U.S. PATENT DOCUMENTS 4,549,841 A * 10/1985 Ishige ...................... B65G 1/02
294/81.1
5,664,928 A * 9/1997 Stauber ................ B65G 1/1378
414/269
(Continued)

FOREIGN PATENT DOCUMENTS

| WO | WO 2011/035839 | 3/2011 |
| WO | WO 2017/100170 | 6/2017 |
| WO | WO 2017/156586 | 9/2017 |

OTHER PUBLICATIONS

Baker, "Automated Street Crossing for Assistive Robots," Proceedings of the 2005 IEEE, Jun. 28-Jul. 1, 2005.
(Continued)

*Primary Examiner* — Jonathan Snelting
(74) *Attorney, Agent, or Firm* — Womble Bond Dickinson (US) LLP

(57) ABSTRACT

A storage system (100) is adapted to store a plurality of items and to load a delivery robot (2) with an item. The storage system (100) includes a delivery robot level (110), at least one storage level (112, 114, 116, 118) for storing the items, and a loading robot (130) adapted to grip the items and to load the items from a storage level (112, 114, 116, 118) to a delivery robot (2) located on the delivery robot level (110). The storage system (100) is adapted to move the items within a storage level (112, 114, 116, 118). The storage system may be provided with wheels and thus be mobile. It may be loaded onto a vehicle for transport from a loading area where the storage system is loaded with items for delivery, to a delivery area where the items are to be delivered by one or more delivery robots.

32 Claims, 14 Drawing Sheets

(51) Int. Cl.
*G06Q 50/30* (2012.01)
*G06Q 10/08* (2012.01)

(52) U.S. Cl.
CPC .............. *G06Q 50/30* (2013.01); *B65G 1/04* (2013.01); *G05D 2201/0213* (2013.01)

(56) References Cited

U.S. PATENT DOCUMENTS

| | | | |
|---|---|---|---|
| 5,942,869 A | 8/1999 | Katou et al. | |
| 6,467,293 B1* | 10/2002 | Goosman | B60H 1/3232 62/239 |
| 6,602,037 B2* | 8/2003 | Winkler | B65G 1/023 414/273 |
| 7,073,634 B2* | 7/2006 | Mitchell | B65G 1/0414 187/414 |
| 7,894,939 B2 | 2/2011 | Zini et al. | |
| 7,931,431 B2* | 4/2011 | Benedict | B63B 25/22 280/755 |
| 8,485,285 B2* | 7/2013 | Ferrigni | B60P 3/20 180/2.1 |
| 8,948,914 B2 | 2/2015 | Zini et al. | |
| 9,020,632 B2* | 4/2015 | Naylor | B65G 1/065 414/273 |
| 9,031,692 B2 | 5/2015 | Zhu | |
| 9,120,622 B1 | 9/2015 | Elazary et al. | |
| 9,244,147 B1 | 1/2016 | Soundararajan et al. | |
| 9,256,852 B1 | 2/2016 | Myllymaki | |
| 9,266,675 B2* | 2/2016 | Yamashita | B65G 1/0492 |
| 9,373,149 B2 | 6/2016 | Abhyanker | |
| 9,557,740 B2 | 1/2017 | Crawley | |
| 9,561,941 B1 | 2/2017 | Watts | |
| 9,630,619 B1 | 4/2017 | Kentley et al. | |
| 9,682,481 B2 | 6/2017 | Lutz et al. | |
| 9,694,976 B1 | 7/2017 | Wurman et al. | |
| 9,791,557 B1 | 10/2017 | Wyrwas et al. | |
| 9,844,879 B1 | 12/2017 | Cousins et al. | |
| 2003/0165373 A1 | 9/2003 | Felder et al. | |
| 2006/0237239 A1 | 10/2006 | Bruner et al. | |
| 2012/0090110 A1 | 4/2012 | Van Den Berg et al. | |
| 2013/0110281 A1 | 5/2013 | Jones et al. | |
| 2013/0332021 A1 | 12/2013 | Goren | |
| 2014/0081445 A1 | 3/2014 | Villamar | |
| 2014/0136414 A1 | 5/2014 | Abhyanker | |
| 2014/0254896 A1 | 9/2014 | Zhou et al. | |
| 2014/0365258 A1 | 12/2014 | Vestal et al. | |
| 2015/0006005 A1 | 1/2015 | Yu et al. | |
| 2015/0045945 A1 | 2/2015 | Zini et al. | |
| 2015/0100152 A1 | 4/2015 | Barragán Treviño et al. | |
| 2015/0183581 A1 | 7/2015 | Worsley | |
| 2015/0379468 A1 | 12/2015 | Harvey | |
| 2016/0207710 A1* | 7/2016 | Conrad | B65G 1/0485 |
| 2016/0325928 A1* | 11/2016 | Lepek | B65G 63/004 |
| 2016/0355337 A1 | 12/2016 | Lert et al. | |
| 2016/0368464 A1 | 12/2016 | Hassounah | |
| 2017/0017237 A1 | 1/2017 | Tokuyama et al. | |
| 2017/0100837 A1 | 4/2017 | Zevenbergen et al. | |
| 2017/0185853 A1 | 6/2017 | Yokota et al. | |
| 2017/0220981 A1 | 8/2017 | Shucker et al. | |
| 2017/0248966 A1 | 8/2017 | Lutz et al. | |
| 2017/0267452 A1 | 9/2017 | Goren et al. | |
| 2017/0364074 A1 | 12/2017 | Lau et al. | |
| 2017/0368684 A1 | 12/2017 | Zevenbergen et al. | |
| 2018/0005169 A1 | 1/2018 | High et al. | |
| 2018/0020896 A1 | 1/2018 | High et al. | |
| 2018/0024554 A1 | 1/2018 | Brady et al. | |
| 2018/0079626 A1 | 3/2018 | Brady et al. | |

OTHER PUBLICATIONS

International Search Report dated Jan. 21, 2019, issued in PCT counterpart application (No. PCT/EP2018/083106).
Written Opinion dated Jan. 21, 2019, issued in PCT counterpart application (No. PCT/ EP2018/083106).

* cited by examiner

STORAGE SYSTEM, USE AND METHOD WITH ROBOTIC PARCEL RETRIEVAL AND LOADING ONTO A DELIVERY VEHICLE

FIELD OF THE INVENTION

The present invention relates to the storage and retrieval of items for delivery by a delivery robot.

BACKGROUND

Typically, items are delivered by making use of vans driven by a human driver. The items are loaded into the van at a depot. The van then drives from the depot to the address of the recipient of an item. The driver unloads the item to be delivered to the recipient, walks to the door of the recipient, rings the recipient's door bell and hands over the item to the recipient. The driver then walks back to the van and performs the subsequent deliveries.

While the above described process may be satisfactory in some instances, it has certain drawbacks, particularly with regard to efficiency and usage of resources (in particular, the time of the driver and fuel consumption). In light of such problems, US 2015/0379468A1 suggests to use small autonomous delivery vehicles (called a "secondary delivery vehicle" in the '468 publication) to perform the final step of delivery. While this solution may have some advantages vis-à-vis the classical delivery process, it is still far from optimal. That is, it also has some disadvantages and shortcomings. In particular, the delivery process described in US 2015/0379468A1 still requires a substantial amount of human labor. For example, the autonomous delivery vehicle is loaded manually and the delivery van itself (called a "primary delivery vehicle" in the '468 publication) typically is operated by a human driver. However, human labor may be too valuable to perform such simple tasks. Furthermore, the present process may still not be optimal as regards fail safety and efficiency (both as regards costs and usage of resources).

It is an object of the present invention to overcome or at least alleviate at least some of the shortcomings and disadvantages of the prior art. In other words, it is an object of the present invention to provide a storage system, use and method that are more efficient and/or more fail safe than the prior art.

SUMMARY

These objects are met by the present invention.

In a first embodiment, the invention discloses a storage system adapted to store a plurality of items and to load a delivery robot with an item. The storage system comprises a delivery robot level, at least one storage level other than the delivery level for storing the items, and a loading robot. The loading robot is adapted to grip the items and to load the items from a storage level to a delivery robot located on the delivery robot level. The storage system is adapted to move the items on the storage level.

In some embodiments, the system may be configured to load the delivery robot with any one of said plurality of items for delivery to a destination. The loading robot may be adapted to grip the items directly and/or indirectly. For example, the item may be a book. Direct gripping means that the loading robot grips the book directly, i.e., is in direct contact with the book. Indirect gripping means that the book is located in another device, such as a box, and that the loading robot contacts this other device, and thereby indirectly also grips the book. All this should be understood to be encompassed by the term "gripping". Furthermore, when using the term loading the items to a delivery robot, this should be understood to encompass that the items are loaded into and/or onto a delivery robot.

The loading robot may be adapted to grip at least one of the items and to load the item from a storage level to a delivery robot located on the delivery robot level. In other words, the loading robot is adapted to retrieve a given item form a storage level and then load the retrieved item to a delivery robot located on the delivery robot level.

As stated, the storage system is adapted to move the items on the storage level. In other words, the storage system is adapted to move the given item within said storage level, particularly towards a pre-loading location in which the given item is accessible to the loading robot.

The loading robot may be adapted to grip the given item and to load the gripped item to the delivery robot.

The storage system may be located inside of a shipping container, inside a van, and/or a building or a part of a building. The storage system may also be located outdoors in some embodiments.

Such a storage system allows the intermediate storing of items to be transported to the recipients of the items. The above system may be provided as a hub for the delivery robots. Items to be delivered may be transported to the storage system by a van and may be intermediately stored in the storage system before being loaded into or onto the delivery robots. Thus, the storage system may increase the efficiency of a delivery process employing delivery robots.

The delivery robot as described in the present application can be particularly configured to operate in unstructured environments, such as outdoor environments. The robot can be particularly used to deliver items to delivery recipients over distances of a few kilometers. The robot can therefore perform "last mile delivery". The delivery robot can also be used for other purposes involving transporting items, and the robot can operate indoors as well.

In some embodiments, the items can be stored in boxes and the loading robot can be adapted to grip the boxes and to load the boxes to the delivery robot and the storage system may be adapted to move the boxes on the storage level. The boxes can also comprise baskets, or similar containers configured to store items. The boxes can present a distinct advantage in storing the items: a plurality of items can be stored in one box and loaded all at once to the delivery robot, the space can be optimized, since the boxes can comprise a standard shape and/or a few standard shapes. Furthermore, the boxes can be arranged on the levels in a manner that is unsuitable for arranging the individual items (for example, the boxes can be hanged by handles or special purpose hooks from supports or other corresponding holding means). Furthermore, by having regularly shaped boxes (instead of individually shaped objects), the handling of these boxes may also be simplified, thereby allowing for a simpler and more fail safe automation.

In particular, the items may be stored in boxes, the loading robot may be adapted to grip a box and load the gripped box to the delivery robot; and the storage system may further be adapted to move any one of the boxes within a storage level towards said pre-loading position, such that said box is accessible to the loading robot.

In some embodiments, the storage system can comprise a plurality of storage levels for storing the items. The use of multiple levels in a storage system is particularly advantageous, since it can allow for an optimization of the overall used space, a system and/or hierarchy in the storage of items based on the time until they should be loaded into the delivery robot.

In some embodiments, the storage system can comprise at least one shuffle robot adapted to move the items on the storage level. That is, the shuffle robot can be configured to move along the storage level (or levels) and bring the items from their storage position to a position where they can be gripped by the loading robot.

That is, the storage system may be adapted to move the items on the storage level by means of the at least one shuffle robot. However, it should be understood that this embodiment is merely exemplary and that this moving of the items on the storage level may also be attained by different means. As a mere example, when the items are located in boxes, the boxes could be arranged in an abutting and sliding manner and complete "rows" and "columns" of boxes could be pushed by respective pusher elements to thereby bring the desired box to a desired location. Furthermore, instead of providing the shuffle robots, the storage levels could be provided with a plurality of motor driven rollers and/or conveyors and by means of such rollers, the items can be transported on the storage levels. It will thus be understood that while an embodiment with a shuffle robot is described herein, other embodiments are also possible to move items on the storage level.

In particular, the storage system may further comprise at least one shuffle robot adapted to move an object within a storage level to said pre-loading location, such that the object is accessible to the loading robot.

In some such embodiments, the shuffle robot can be adapted to move the boxes on the storage level. That is, the shuffle robot can, for example, lift the boxes and carry them towards a specific end of the storage level where the loading robot can take them over. The shuffle robot can also be configured to drag the boxes or push the boxes. The shuffle robot can also be configured to rearrange the boxes to optimize the overall delivery robot loading time.

The shuffle robot may comprise at least one of a position sensor, a camera and a lidar sensor. This may help the shuffle robot to navigate and to perform its tasks.

In some embodiments, the storage system can comprise a plurality of shuffle robots. For example, if multiple storage levels are present, there can be one shuffle robot per level. Additionally or alternatively, there can be a plurality of shuffle robots on each level. The advantage of this may be that the shuffle robots can access any item located on any level without having to move between the levels (or being moved by the loading robot). In this way, the speed of loading one or more of the delivery robots with one or a plurality of items can be optimized.

In some embodiments, the loading robot can comprise three axes of movement and a gripping mechanism, which may be configured for gripping objects. That is, the loading robot can move at least parts of itself along at least three axes, such as up and down, forward and backward, and left and right. This can be particularly useful for retrieving items from storage levels and transferring them to the delivery robot. For example, the loading robot can reach to a higher storage level with the gripping mechanism, extend forward to grab an item (preferably a box with items), bring it below, move to the side to reach the delivery robot loading position, and load the delivery robot with the item. The loading robot can also do this in reverse. That is, it can retrieve an empty box from the delivery robot, move it to a storage level (potentially a storage level for empty boxes), and then load the robot with a new box. The gripping mechanism can comprise a mechanical gripping mechanism that can grab items and/or fixedly attach to boxes so as to load them to the robot. The gripping mechanism can also comprise an electromagnetic gripper and/or other types of gripper.

In some embodiments, the storage system can comprise a sensor for sensing the location of an object to be gripped by the gripping mechanism. The sensor can serve to increase the fault tolerance of the system, any damage to the item and/or the loading robot due to incorrect positioning of the gripping mechanism and/or dropping the item and to speed up the operation of the storage system.

In some such embodiments, the loading robot can comprise the sensor. In other words, the sensor can be mounted on the loading robot. That is, the sensor can be attached to the loading robot, preferably at or near the gripping mechanism. This may ensure that the sensor moves with the loading robot as it moves the items to the delivery robot and vice versa.

In some such embodiments, the sensor can be a camera. The sensor can comprise a camera configured to take images and/or videos. There can also be a plurality of cameras pointing in different directions. The sensor can also comprise an ultrasonic sensor, an inductive sensor, a hall effect sensor and/or a combination of a plurality of sensors.

In some embodiments, the gripping mechanism can comprise a magnetic gripping element, a mechanical gripping element, a pneumatic gripping element and/or an electroadhesion gripping element.

In some embodiments, at least one storage level can comprise a plurality of supports for supporting the boxes. The supports can comprise protruding rods of various shapes. In other embodiments, the supports can comprise hooks or similar contraptions configured to hang things from. The supports can be arranged such that the boxes can be placed on top of them or hanged from them. This configuration can be particularly advantageous for placing the baskets on (or under) the supports, so that the shuffle robot (if present) can roll under them and lift them off of the supports, therefore placing the boxes on itself.

In some embodiments, the shuffle robot can comprise an actuator that is adapted to assume a retracted configuration and an extended configuration for lifting the items. That is, the shuffle robot can comprise a varying height that can be adjusted via the actuator.

In some such embodiments, the shuffle robot can have a first height in the retracted configuration and a second height in the extended configuration wherein the first height may be smaller than the height of the supports and the second height may be greater than the height of the supports, wherein preferably the difference between the second height and the first height is in the range of 5 mm to 100 mm, such as 10 mm to 50 mm. As described above, this refers to the shuffle robot placing itself underneath a basket installed on the supports and/or hanging from them, and lifting itself (preferably via the actuator), in order to free the basket from the supports and carry it. The mentioned height difference is particularly advantageous, as it allows for a reasonable size of the supports while optimizing the overall space requirements.

In some embodiments, the boxes can be configured to be suspended from the supports; the shuffle robot can have a first height in the retracted configuration and a second height in the extended configuration; wherein the first height may be smaller than a distance between the boxes and a respective storage level; and the second height may be greater than the distance between the boxes and the respective storage level. In such embodiments, the difference between the second height and the first height may be in the range of 5 mm to 100 mm, such as 10 mm to 50 mm. That is, in the configuration where the boxes are hanging above a preceding storage level (and or above the delivery robot level), the shuffle robot can take the desired box from a level below by stopping below it and extending itself via the actuator.

In some embodiments the shuffle robot can comprise a plurality of wheels. In some such embodiments, each wheel can be adapted to rotate around a principal axis of rotation of the respective wheel and each wheel can further comprise sections that are rotatable around different rotation axes. For example, the wheels may be realized as omni wheels, poly wheels or mecanum wheels. This can be particularly advantageous for the shuffle robot, since such wheels would allow it to smoothly travel in an arbitrary direction. It also contributes to the shuffle robot's maneuverability and can serve to generally improve the space optimization within the storage system.

In some embodiments, the storage system can further comprise a housing enclosing a storage compartment of the storage system. In some such embodiments, the delivery robot level, the at least one storage level and the loading robot can be located inside the storage compartment. In some such embodiments, the storage compartment can have a volume of 1 $m^3$ to 1000 $m^3$, preferably of 10 $m^3$ to 500 $m^3$, further preferably of 20 $m^3$ to 200 $m^3$. That is, the present storage system can have a significantly smaller total volume than typically known storage systems such as warehouses.

In some such embodiments, the boxes can have a total box volume and the ratio of the total box volume to the volume of the storage compartment is at least 30%, preferably at least 50%, further preferably at least 70%, most preferably at least 80%. That is, the storage compartment can be preferably mostly occupied by boxes. The occupation density of the present storage system is therefore significantly large and exceeding most typically known storage systems. The advantage can be that despite the smaller size of the storage system, it can fit many items to be loaded into the delivery robots. Furthermore, the overall space usage can be optimized. Such a large density can be preferably achieved by the combination of automating the storage system (such as by using the loading robot and, preferably, the shuffle robot), and optimizing it for servicing the delivery robot.

In some embodiments, the storage system can further comprise at least one port allowing the delivery robot to enter into the storage system and/or to exit the storage system. In other words, the storage system may comprise at least one port through which the delivery robot enters and/or exits the storage system. The port can be of a suitable size to allow the delivery robot to pass through it, but not significantly larger. The port can comprise an open and a closed position. Preferably, the port switches to the open position immediately before the delivery robot enters, and switches back to the closed position after the delivery robot is inside. In other words, the port can be in the closed position unless the delivery robot is about to enter and/or exit through it. The port can be advantageous, as it can lead the delivery robot to the delivery robot level where it can be loaded with items. In the closed position, the port can ensure that the storage system is separated from its surroundings and shielded from vandalism, weather and other undesirable factors.

In some embodiments, the storage system can comprise two ports. For example, one port can serve as the entry port for the delivery robot, and another port can serve as an exit port. This can be preferable to having only one port, since it can increase the overall speed of the delivery robot being serviced by the storage system. For example, a second robot approaching the storage system would not need to wait for the first robot to exit through the only port if a plurality of ports is present. In some such embodiments, the storage system can comprise at least three ports. In such embodiments, two ports can be entry ports and one port an exit port. The delivery robots can even be loaded with items simultaneously by one or more loading robots. The ports can also not have a fixed function such as an "entry port" and an "exit port", but be used interchangeably as the need arises in order to maximize the overall efficiency of the storage system.

In particular, the storage system may comprise an entry port through which the delivery robot enters the storage system to be loaded with an item for delivery; and an exit port through which the delivery robot exits the storage system after being loaded with said item for delivery, the exit port being separate from the entry port.

In some embodiments, the storage system can further comprise at least one supply compartment to supply items to the system. The supply compartment can be used to introduce items (or boxes) directly into the storage system. For example, a person driving a delivery truck can arrive, load a plurality of items (or boxes) into the storage system, and depart. Additionally or alternative, the supplying of items can be at least partially automated. For example, shuffle robots can be configured to exit the storage system, retrieve items (or boxes) from the outside (such as from a servicing truck that can be manned or autonomous) and bring the items into the storage system via the supply compartment.

In some embodiments, the loading robot and the shuffle robot can be further adapted for the loading robot to grip and release the shuffle robot to bring the shuffle robot from one level to another. This can be advantageous if fewer shuffle robots are present in the system than storage levels, if shuffle robots need to be removed from the system from maintenance and/or if they need to exit the storage system (for example, to bring in more items and/or boxes).

In particular, the loading robot may be configured to grip and release the shuffle robot to bring the shuffle robot from one storage level to another, when the shuffle robot initially is in the pre-loading location of said one storage level.

In some embodiments, the delivery robot level and at least one storage level can be separated by a distance not exceeding 200 cm, preferably not exceeding 150 cm, further preferably not exceeding 100 cm. In other words, the delivery robot can be configured to fit into such a space. The height of the delivery robot not including any foldable components can comprise a height not exceeding 200 cm, preferably not exceeding 150 cm, further preferably not exceeding 100 cm. This can be advantageous, as the overall space used by the storage system can be optimized.

In some embodiments, the loading robot is a vertical loading robot. That is, the loading robot can be configured to primarily move items, boxes and/or shuffle robots vertically.

In some embodiments, the storage system can be a mobile storage system and can further comprise wheels for transporting the storage system. In particular, the storage system may comprise wheels to facilitate transporting the storage system from a loading area where the storage system is loaded with items for delivery, to a delivery area where the items are to be delivered.

For example, in case the storage system comprises the storage compartment, said storage compartment can be fixedly mounted to a truck and/or have a trailer type modular system with temporary wheels. Thus, the storage system would be a mobile storage system that can readily travel to different locations wherever it is needed. Furthermore, the storage system can stay at different locations for different periods of time based on the demand for delivery robots and items to be delivered at such locations.

In a second embodiment, the invention discloses a storage and transport system. The storage and transport system comprises the storage system according to any of the previously described embodiments and is further configured to be transported by a vehicle. The storage and transport system also comprises a vehicle configured to transport the storage system. The storage system is separable from the vehicle.

The storage system may be loaded into the vehicle for transport to a delivery areas. Further, a plurality of delivery robots may be loaded onto the vehicle, for performing deliveries when the vehicle arrives at the delivery area.

In some such embodiments, the vehicle can be a truck. The truck can be a manned and/or a self-driving truck. This can be advantageous, as transport by and/or inside a truck would allow for the storage system to fit within standard sizes allowed on the roads and to be easily movable to different locations.

In a third embodiment, use of the storage system according to any of the previously disclosed embodiments is disclosed. The use is for storing items and for loading at least one delivery robot with at least one item.

In a fourth embodiment, use of the storage and transport system according to any of the previously disclosed embodiments is disclosed. The use is for storing items and for loading at least one delivery robot with at least one item and for transporting the storage system.

In a fifth embodiment, a method of loading an item into a robot is disclosed. The method employs the storage system according to any of the previously disclosed embodiments. The method comprises a delivery robot entering the storage system and the delivery robot travelling to a designated location where it can be loaded by the loading robot. The method further comprises transporting an item on a storage level to a pre-loading location where it can be gripped by the loading robot. The method also comprises the loading robot gripping the item. The method further comprises the loading robot loading the delivery robot with the item. The method also comprises the delivery robot exiting the storage system.

In particular, there may be provided a method of loading an item to a delivery robot, the item being located on a storage level of a storage system as discussed above, the method comprising: the delivery robot entering the storage system and traveling to a designated location on the delivery robot level where the delivery robot is positioned to be loaded by the loading robot; moving the item within the storage level, to a pre-loading location in which the item is accessible to the loading robot; retrieving the item from said pre-loading location with the loading robot and loading the delivery robot with the retrieved item; and the delivery robot leaving the designated location and exiting the storage system.

The method can allow for a particularly time and energy efficient loading of the delivery robot. The automated system described herein also allows for a high density system minimizing the unused space.

In some such embodiments, the item can be located in a box. Then, in the step of transporting the item on the storage level to the pre-loading location where it can be gripped by the loading robot, the box with the item therein can be transported. In the step of the loading robot gripping the item, the loading robot can grip the box with the item. In the step of the loading robot loading the delivery robot with the item, the loading robot can load the delivery robot with the box with the item. As described above, using standardized boxes of the same size (or a few different sizes) allows for a better use of space, easier gripping by the loading robot, quicker loading into the delivery robot (since the delivery robot's empty box can just be replaced by the filled box) and a simpler overall infrastructure of the storage system. Thus, in some embodiments, a first plurality of boxes all having a standard size may be present in the storage system so that each such box may loaded to any one of a second plurality of delivery robots. This "interchangeability" of boxes among the robots makes it possible for any given robot, upon being properly instructed and/or controlled, to carry any package to any destination.

In some embodiments, the storage system can comprise the shuffle robot, and the shuffle robot can perform the step of transporting an item on a storage level to a pre-loading location where it can be gripped by the loading robot. This can allow for an efficient retrieval of the desired box from anywhere on the storage level.

In some such embodiments, prior to the step of the shuffle robot transporting the item on the storage level to the pre-loading location where it can be gripped by the loading robot, the item and the box storing the item can be located on supports. The shuffle robot transporting the item on the storage level to the pre-loading location where it can be gripped by the loading robot can comprise the following steps. The shuffle robot can travel underneath the box in the retracted configuration. The shuffle robot can change from the retracted to the extended configuration while being underneath the box to thereby support (i.e., lift) the box. The shuffle robot can bring the box to the pre-loading location where it can be gripped by the loading robot. In this way, the shuffle robot can remove the boxes from supports and safely transport them towards the loading robot. The boxes can rest on the supports on each of the storage levels or hang from the supports above the below level (in which case the shuffle robot can retrieve them by traveling on the below level and extending to remove them from the above supports).

In other words, in some embodiments, the item may be located in a box which is supported by supports; and the method may include moving the item within the storage level comprises lifting the box off of the supports, and transporting the lifted box to the pre-loading location.

In particular, such a method may include bringing a shuffle robot underneath the box prior to lifting the box, the shuffle robot having a retracted configuration and an extended configuration; wherein:

the shuffle robot is brought underneath the box, when the shuffle robot is in the retracted configuration, and the shuffle robot transports the box to the pre-loading position, when the shuffle robot is in the extended position.

In some embodiments, the delivery robot can enter the storage system through a first port and the delivery robot can leave the storage system through a second port being different from the first port. In other words, the storage system can have an optimized route for the delivery robot through it that can allow for a quicker loading of the delivery robot with items and even potentially simultaneous loading of a plurality of delivery robots.

The present invention is also defined by the following numbered embodiments.

Below, system embodiments will be discussed. These embodiments carry the letter "S" followed by a number. Whenever reference is herein made to system embodiments, those embodiments are meant.

S1. A storage system adapted to store a plurality of items and to load a delivery robot with an item, wherein the storage system comprises
  a delivery robot level,
  at least one storage level for storing the items, the at least one storage level being different from the delivery robot level,
  a loading robot adapted to grip at least one of the items and to load the item from a storage level to a delivery robot located on the delivery robot level,
  wherein the storage system is adapted to move the items on the storage level.

In some embodiments, the system may be configured to load the delivery robot with any one of said plurality of items for delivery to a destination. The loading robot may be adapted to grip the items directly and/or indirectly. For example, the item may be a book. Direct gripping means that the loading robot grips the book directly, i.e., is in direct contact with the book. Indirect gripping means that the book is located in another container or device, such as a box, and that the loading robot contacts this other device (such as a box), and thereby indirectly also grips the book. All this should be understood to be encompassed by the term gripping. Furthermore, when using the term loading the items to a delivery robot, this should be understood to encompass that the items are loaded into and/or onto a delivery robot.

As stated, the loading robot is adapted to grip at least one of the items and to load the item from a storage level to a delivery robot located on the delivery robot level. In other words, the loading robot is adapted to retrieve a given item form a storage level and then load the retrieved item to a delivery robot located on the delivery robot level.

As stated, the storage system is adapted to move the items on the storage level. In other words, the storage system is adapted to move the given item within said storage level, particularly towards a pre-loading location in which the given item is accessible to the loading robot.

The loading robot may be adapted to grip the given item and to load the gripped item to the delivery robot.

S2. The storage system according to the preceding embodiment, wherein the items are stored in boxes and wherein the loading robot is adapted to grip the boxes and to load the boxes to the delivery robot and wherein the storage system is adapted to move the boxes on the storage level.

In particular, the items may be stored in boxes, the loading robot may be adapted to grip a box and load the gripped box to the delivery robot; and the storage system may further be adapted to move any one of the boxes within a storage level towards said pre-loading position, such that said box is accessible to the loading robot.

S3. The storage system according to any of the preceding embodiments, wherein the storage system comprises a plurality of storage levels for storing the items.

S4. The storage system according to any of the preceding embodiments, wherein the storage system comprises at least one shuffle robot adapted to move the items on the storage level.

That is, the storage system may be adapted to move (i.e., to change the location of) the items on the storage level by means of the at least one shuffle robot. However, it should be understood that this embodiment is merely exemplary and that this moving of the items on the storage level may also be attained by different means. As a mere example, when the items are located in boxes, the boxes could be arranged in an abutting and sliding manner and complete "rows" and "columns" of boxes could be pushed by respective pusher elements to thereby bring the desired box to a desired location. Furthermore, instead of providing the shuffle robots, the storage levels could be provided with a plurality of motor driven rollers and/or conveyors and by means of such rollers, the items can be transported on the storage levels. It will thus be understood that while an embodiment with a shuffle robot is described herein, other embodiments are also possible to move items on the storage level.

In particular, the storage system may further comprise at least one shuffle robot adapted to move an object within a storage level to said pre-loading location, such that the object is accessible to the loading robot.

S5. The storage system according to the preceding embodiment and with the features of embodiment S2, wherein the shuffle robot is adapted to move the boxes on the storage level.

S6. The storage system according to any of the preceding embodiments and with the features of embodiment S4, wherein the shuffle robot comprises at least one of a position sensor, a camera and a lidar sensor.

S7. The storage system according to any of the 3 preceding embodiments, wherein the storage system comprises a plurality of shuffle robots.

S8. The storage system according to any of the preceding embodiments, wherein the loading robot comprises three axes of movement and a gripping mechanism.

The gripping mechanism may be configured for gripping objects.

S9. The storage system according to the preceding embodiment, wherein the storage system comprises a sensor for sensing the location of an object to be gripped by the gripping mechanism.

S10. The storage system according to the preceding embodiment, wherein the loading robot comprises the sensor.

In other words, the sensor may be mounted on the loading robot.

S11. The storage system according to any of the preceding 2 embodiments, wherein the sensor is a camera.

S12. The storage system according to any of the preceding 4 embodiments, wherein the gripping mechanism comprises a magnetic gripping element, a mechanical gripping element, a pneumatic gripping element and/or an electroadhesion gripping element.

S13. The storage system according to any of the preceding embodiments and with the features of embodiment S2, wherein at least one storage level comprises a plurality of supports for supporting the boxes.

S14. The storage system according to any of the preceding embodiments and with the features of embodiment S4, wherein the shuffle robot comprises an actuator that is adapted to assume a retracted configuration and an extended configuration for lifting the items.

S15. The storage system according to the preceding embodiment and with the features of the penultimate embodiment, wherein the shuffle robot has a first height in the retracted configuration and a second height in the extended configuration and wherein the first height is smaller than the height of the supports and the second height is greater than the height of the supports, wherein preferably the difference between the second height and the first height is in the range of 5 mm to 100 mm, such as 10 mm to 50 mm.

S16. The storage system according to any of the preceding embodiments and with the features of embodiments S2 and S14 wherein the boxes are configured to be suspended from the supports;

the shuffle robot has a first height in the retracted configuration and a second height in the extended configuration;

the first height is smaller than a distance between the boxes and a respective storage level; and the second height is greater than the distance between the boxes and the respective storage level; and wherein preferably the difference between the second height and the first height is in the range of 5 mm to 100 mm, such as 10 mm to 50 mm.

S17. The storage system according to any of the preceding embodiments with the features of embodiment S4, wherein the shuffle robot comprises a plurality of wheels.

S18. The storage system according to the preceding embodiment, wherein each wheel is adapted to rotate around a principal axis of rotation of the respective wheel and wherein each wheel further comprises sections that are rotatable around different rotation axes.

For example, the wheels may be realized as omni wheels, poly wheels or mecanum wheels.

S19. The storage system according to any of the preceding embodiments, wherein the storage system further comprises a housing enclosing a storage compartment of the storage system.

S20. The storage system according to the preceding embodiment, wherein the delivery robot level, the at least one storage level and the loading robot are located inside the storage compartment.

S21. The storage system according to any of the preceding 2 embodiments, wherein the storage compartment has a volume of 1 $m^3$ to 1000 $m^3$, preferably of 10 $m^3$ to 500 $m^3$, further preferably of 20 $m^3$ to 200 $m^3$.

S22. The storage system according to any of 3 preceding embodiments and with the features of embodiment S2, wherein the boxes have a total box volume and wherein the ratio of the total box volume to the volume of the storage compartment is at least 30%, preferably at least 50%, further preferably at least 70%, most preferably at least 80%.

S23. The storage system according to any of the preceding embodiments, wherein the storage system further comprises at least one port allowing the delivery robot to enter into the storage system and/or to exit the storage system.

In other words, the storage system may comprise at least one port through which the delivery robot enters and/or exits the storage system.

S24. The storage system according to the preceding embodiment, wherein the storage system comprises two ports.

In particular, the storage system may comprise an entry port through which the delivery robot enters the storage system to be loaded with an item for delivery; and an exit port through which the delivery robot exits the storage system after being loaded with said item for delivery, the exit port being separate from the entry port.

S25. The storage system according to the preceding embodiment, wherein the storage system comprises at least three ports.

S26. The storage system according to any of the preceding embodiments, wherein the storage system further comprises at least one supply compartment to supply items to the system.

S27. The storage system according to any of the preceding embodiments with the features of embodiment S4, wherein the loading robot and the shuffle robot are further adapted for the loading robot to grip and release the shuffle robot to bring the shuffle robot from one level to another.

In particular, the loading robot may be configured to grip and release the shuffle robot to bring the shuffle robot from one storage level to another, when the shuffle robot initially is in the pre-loading location of said one storage level.

S28. The storage system according to any of the preceding embodiments, wherein the delivery robot level and at least one storage level are separated by a distance not exceeding 200 cm, preferably not exceeding 150 cm, further preferably not exceeding 100 cm.

S29. The storage system according to any of the preceding embodiments, wherein the loading robot is a vertical loading robot.

S30. The storage system according to any of the preceding embodiments, wherein the storage system further comprises a controller, wherein the controller is configured to control the storage system to move the items on the storage level; and control the loading robot.

S31. The storage system according to the preceding embodiment and with the features of embodiment S4, wherein the controller is further configured to control the shuffle robot.

S32. The storage system according to any the two preceding embodiments and with the features of embodiment S23, wherein the controller is further configured to control the at least one port.

S33. The storage system according to any of the three preceding embodiments, wherein the controller is further configured to communicate with a delivery robot.

S34. The storage system according any of the preceding embodiments, wherein the storage system is a mobile storage system and further comprises wheels for transporting the storage system.

For example, in case the storage system comprises the storage compartment, said storage compartment can be fixedly mounted to a truck and/or have trailer type modular system with temporary wheels. Thus, the storage system would be a mobile storage system that can readily travel to different locations wherever it is needed.

In particular, the storage system may comprise wheels to facilitate transporting the storage system from a loading area where the storage system is loaded with items for delivery, to a delivery area where the items are to be delivered.

S35. A storage and transport system comprising the storage system according to any of the embodiments S1 to S33, wherein the storage system is configured to be transported by a vehicle;

a vehicle configured to transport the storage system;

wherein the storage system is separable from the vehicle.

The storage system may be loaded into the vehicle for transport to a delivery areas. Further, a plurality of delivery robots may be loaded onto the vehicle, for performing deliveries when the vehicle arrives at the delivery area.

S32. The storage and transport system according to the preceding embodiment, wherein the vehicle is a truck.

Below, use embodiments will be discussed. These embodiments carry the letter "U" followed by a number. Whenever reference is herein made to use embodiments, those embodiments are meant.

U1. Use of the storage system according to any of the embodiments S1 to S33 for storing items and for loading at least one delivery robot with at least one item.

U2. Use of the storage and transport system of embodiments S34 or S35, for storing items and for loading at least one delivery robot with at least one item and for transporting the storage system.

Below, method embodiments will be discussed. These embodiments carry the letter "M" followed by a number. Whenever reference is herein made to method embodiments, those embodiments are meant.

M1. A method of loading an item into a robot, the method employing the storage system according to any of the preceding system embodiments, the method comprising
a delivery robot entering the storage system and the delivery robot travelling to a designated location where it can be loaded by the loading robot;
transporting an item on a storage level to a pre-loading location where it can be gripped by the loading robot;
the loading robot gripping the item;
the loading robot loading the delivery robot with the item;
the delivery robot exiting the storage system.

In particular, there may be provided a method of loading an item to a delivery robot, the item being located on a storage level of a storage system according to any of the preceding system embodiments, the method comprising: the delivery robot entering the storage system and traveling to a designated location on the delivery robot level where the delivery robot is positioned to be loaded by the loading robot; moving the item within the storage level, to a pre-loading location in which the item is accessible to the loading robot; retrieving the item from said pre-loading location with the loading robot and loading the delivery robot with the retrieved item; and the delivery robot (2) leaving the designated location and exiting the storage system.

M2. The method according to the preceding embodiment, wherein the item is located in a box and wherein
in the step of transporting the item on the storage level to the pre-loading location where it can be gripped by the loading robot, the box with the item is transported;
in the step of the loading robot gripping the item, the loading robot grips the box with the item; and
in the step of the loading robot loading the delivery robot with the item, the loading robot loads the delivery robot with the box with the item.

M3. The method according to any of the preceding method embodiments, wherein the storage system comprises the features of embodiment S4, wherein the shuffle robot performs the step of transporting an item on a storage level to a pre-loading location where it can be gripped by the loading robot.

M4. The method according to the preceding embodiment, wherein the system comprises the features of embodiments S13 and S14,
wherein prior to the step of the shuffle robot transporting the item on the storage level to the pre-loading location where it can be gripped by the loading robot, the item and the box storing the item are located on supports; and
wherein the shuffle robot transporting the item on the storage level to the pre-loading location where it can be gripped by the loading robot comprises
the shuffle robot travelling underneath the box in the retracted configuration,
the shuffle robot changing from the retracted to the extended configuration while being underneath the box to thereby support the box, and
the shuffle robot bringing the box to the pre-loading location where it can be gripped by the loading robot.

In other words, in some embodiments, the item may be located in a box which is supported by supports; and the method may include moving the item within the storage level comprises lifting the box off of the supports, and transporting the lifted box to the pre-loading location.

In particular, such a method may include bringing a shuffle robot underneath the box prior to lifting the box, the shuffle robot having a retracted configuration and an extended configuration; wherein:
the shuffle robot is brought underneath the box, when the shuffle robot is in the retracted configuration, and the shuffle robot transports the box to the pre-loading position, when the shuffle robot is in the extended position.

M5. The method according to any of the preceding method embodiments, wherein the system comprises the features of embodiment S24, wherein
the delivery robot enters the storage system through a first port and
the delivery robot leaves the storage system through a second port which is different from the first port.

BRIEF DESCRIPTION OF DRAWINGS

The invention will now be described with reference to exemplary embodiments and with reference to the accompanying drawings. It should be understood that this description is merely exemplary and should only exemplify the invention, and not limit it.

DETAILED DESCRIPTION

Figure 1:
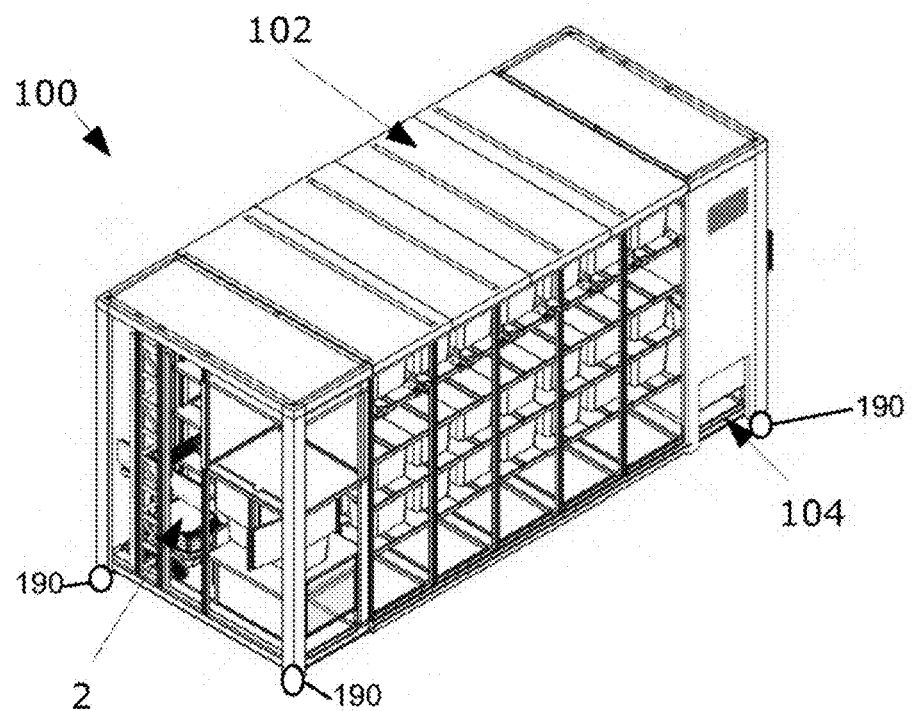
FIG. 1 depicts a storage system in accordance with an embodiment of the present invention.

FIG. 1 depicts a storage system 100. The storage system 100 is adapted to store items and to load items into a delivery robot 2, which delivery robot 2 is also depicted in FIG. 1. Simply put, the depicted storage system 100 is adapted to load and unload items into and out of the delivery robot 2. More particularly, the storage system may also store items safely, in right temperature, humidity, etc. conditions, until the delivery time starts, as will be described in further detail below. The storage system could also store one or more delivery robots 2 and have fully automated systems for delivery robot servicing, like battery swapping, cleaning, telemetry, etc. The storage system could be built only for delivery robot storage and maintenance. It will be understood that the described storage system 100 may increase the efficiency and the fail safety of the overall process.

The storage system 100 comprises a housing 102 delimiting a storage compartment of the storage system 100. It will be understood that only a section of the housing 102 is depicted in FIG. 1 and that some other portions of the housing 102 are depicted as transparent in FIG. 1 to expose the inside of the storage system 100. The housing 102 protects the inside of the storage system 100 from environmental influences, such as wind, rain, hail and snow. The housing 102 further serves to prevent unauthorized access to the storage system 100.

Figure 2:
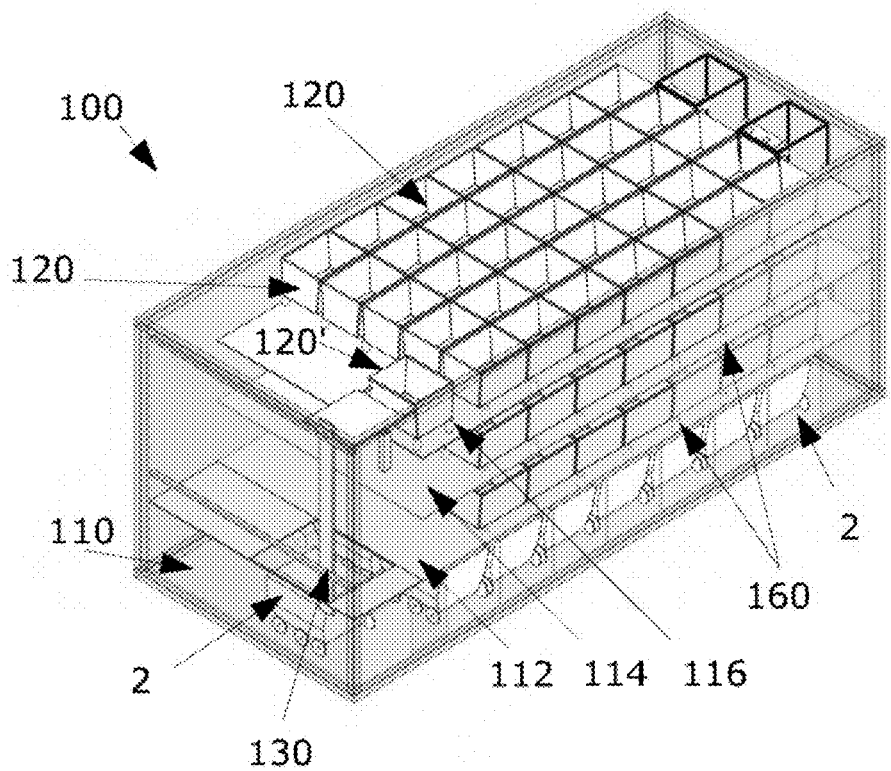
FIG. 2 depicts a storage system in accordance with a further embodiment of the present invention, where the housing is depicted as transparent for illustration purposes.

FIG. 2 depicts an embodiment of a storage system 100, where all the housing sections have been made transparent to reveal the complete inside of the storage system 100. The storage system 100 comprises different levels, including a delivery robot level 110 and one or more storage levels 112, 114, 116. In the depicted embodiment, the delivery robot level 110 is the ground level and the storage levels 112, 114, 116 are above the delivery robot level 110. However, it will be understood that other configurations are also possible. In FIG. 2, there is also a plurality of delivery robots 2 that are located on the delivery robot level 110. That is, the delivery robots 2 can be housed in the storage system 100 when not out for deliveries. On each storage level 112, 114, 116, there is a plurality of boxes 120 that may house items. The boxes 120 have a size to fit into the delivery robots 2. As will be understood, the storage system 100 can load the boxes 120 into the robots 2 and can unload the boxes 120 from the robots 2.

For the loading and unloading, the storage system 100 comprises a loading robot 130 that is schematically depicted in FIG. 2 and discussed in further detail below. The loading robot 130 is adapted to grip and release a box 120 and to transport it in a cartesian direction, such as in the vertical direction. Thus, the loading robot 130 depicted in the embodiments may also be referred to as a vertical loading robot 130. Thus, the loading robot 130 may grip a box 120 that is located on one of the storage levels 112, 114, 116, move the box 120 vertically and load it into a delivery robot 2 located on the delivery robot level 110. Furthermore, the loading robot 130 may also grip a box 2 that is located in a delivery robot 2, which delivery robot 2 is located on the delivery robot level 110, move it to a storage level 112, 114, 116 and release the box 2 at such a storage level 112, 114, 116 and optionally move horizontally.

Figure 3:
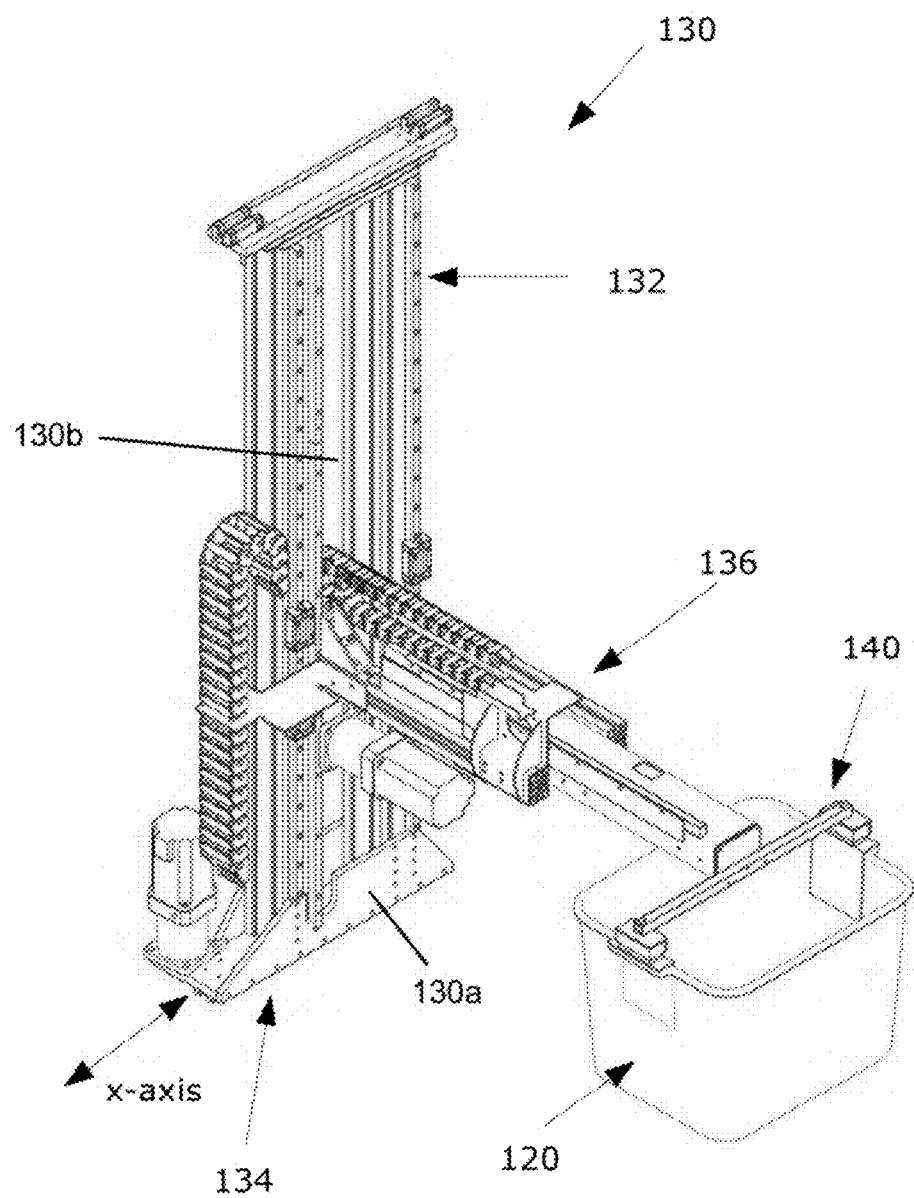
FIGS. 3 to 5 depict a loading robot to be employed in embodiments of the present invention.

One example of a loading robot 130 is depicted in FIG. 3. The depicted loading robot 130 is adapted to move along three axes 132, 134, 136 that are perpendicular to one another. More particularly, the loading robot 130 is adapted to move along a vertical axis 132 (that may also be referred to as the z-axis) and two horizontal axes 134 (that may also be referred to as the x-axis), 136 (that may also be referred to as the y-axis). Note, that the x-axis 134 is only partially shown in the figure, and the direction of motion along it is further indicated with a double-sided arrow "x-axis". Furthermore, the loading robot 130 has a gripper mechanism 140 that is adapted to grip and release a box 120 or another object, for example a shuffle robot 150.

Again with reference to FIG. 2, it will be understood that the loading robot 130 may move along the vertical axis 132 in an upward direction, grip box 120' by means of its gripper mechanism 140, move down along the vertical axis 132, place the box 120' in a delivery robot 2 and release it there.

Figure 4:
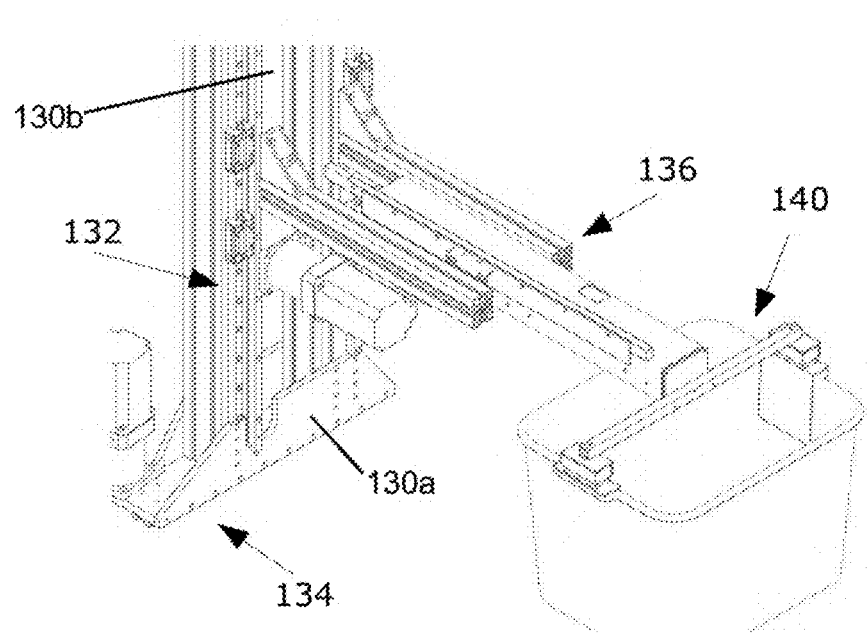
Figure 5:
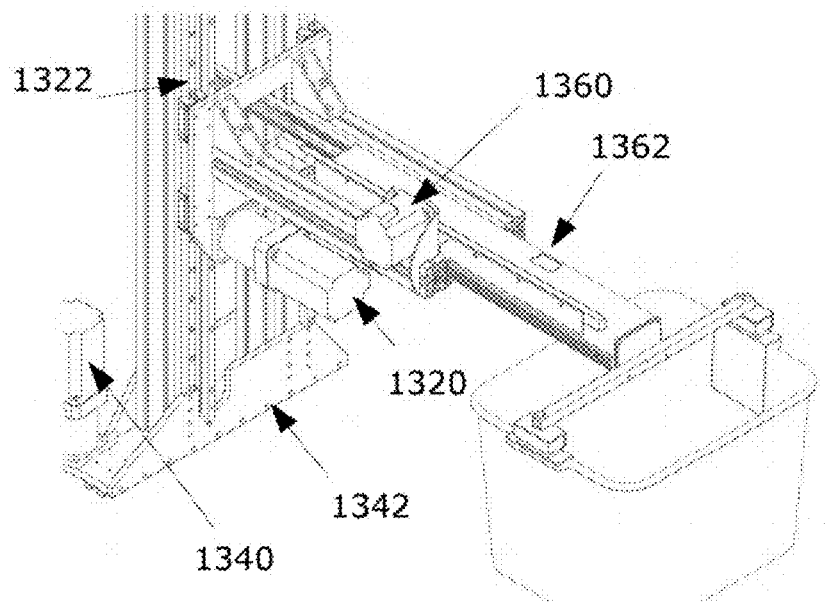

Further details of the loading robot 130 depicted in FIG. 3 can also be seen in FIGS. 4 and 5. The loading robot 130 comprises a base 130a, a vertically extending body 130b connected to the base 130a, and a gripper mechanism 140 extending outwardly from the vertically extending body 130b. As discussed, the loading robot 130, or, more particularly, its gripper mechanism 140, is adapted to move along the axes 132, 134, 136. As can be seen in FIGS. 4 and 5, this movement may be achieved by means of gear racks 1322, 1342, 1362. That is, gear rack 1322 moves the gripper mechanism 140 along axis 132, gear rack 1342 moves the gripper mechanism 140 along axis 134 (only schematically shown in the figure), and gear rack 1362 moves the gripper mechanism 140 along axis 136. Furthermore, the loading robot 130 comprises three motors 1320, 1340, 1360, each motor driving a gear wheel in engagement with the respective gear rack 1322, 1342, 1362. The motors 1320, 1340, 1360 can comprise hybrid-stepper motors. It will be understood that this mechanism of moving the loading robot 130 is merely exemplary and that there are other possibilities to have another type of mechanical linear axes movements. Thus, the gripping mechanism 140 may move along the axes 132, 134, 136.

Figure 13:
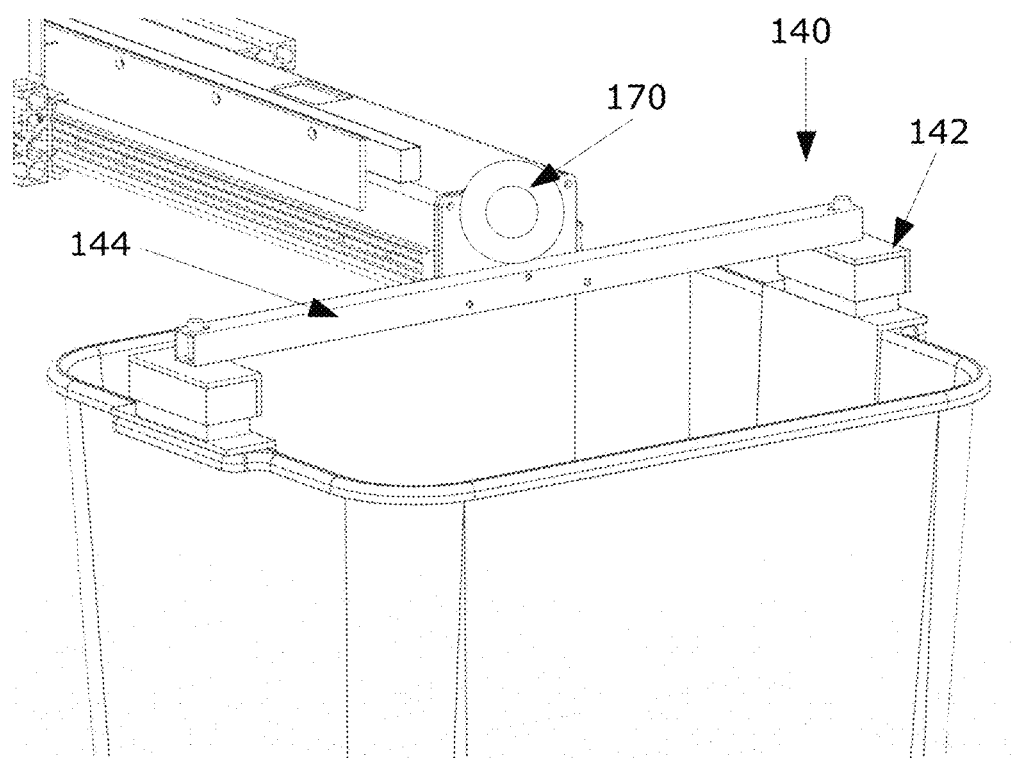
FIGS. 13 to 17c depict embodiments of gripping mechanisms to be employed in embodiments of the present invention.

Embodiments of the gripping mechanism 140 are depicted in FIGS. 13 to 17c. FIG. 13 depicts a first embodiment of a gripping mechanism 140. This gripping mechanism 140 includes magnetic elements 142 (such as two magnetic elements 142), only one of which is labeled in FIG. 13. In the depicted embodiment, the magnetic elements 142 are located on a bar 144 of the gripping mechanism 140. The magnetic elements 142 are realized as magnetic jaws 142. The magnetic elements 142 typically are electromagnets and their magnetic properties can be switched on and off by means of an electric current, as is known to those skilled in the art. It will be understood that by means of the gripping mechanism 140 depicted in FIG. 13, boxes 120 having a magnetic section can be gripped. The magnetic sections are typically formed of a ferromagnetic material.

That is, the gripping mechanism 140 may be positioned at the box 120 having a magnetic section (or magnetic sections), the magnetic elements 142 may be switched on to thereby "grip" the box by means of the electromagnetic force. The box 120 may then be repositioned by means of the loading robot 130. Once the box 120 is positioned at the desired location, the magnetic elements 140 can be switched off to thereby release the box 120.

FIG. 13 also depicts a sensor 170, which is typically realized as a camera 170. That is, the system 100 may comprise a sensor 170 and more particularly a camera 170. In the depicted embodiment, the sensor 170 is a part of the loading robot 130 and its position is fixed with respect to the gripping mechanism 140. The sensor 170 senses the location of the box 120 to be gripped by the gripping mechanism 140 and therefore allows the gripping mechanism 140 to be located at a location allowing gripping of the box 120. The sensor 170 can also be placed differently. Furthermore, there can be a plurality of sensors 170, such as a plurality of cameras 170.

A further embodiment of the gripping mechanism 140 is depicted in FIGS. 14 and 15a to 15c. Again, the system 100 (and more particularly the loading robot 130) comprises a sensor 170, such as a camera 170, for sensing the location of an object to be gripped, such as a box 120 (see FIG. 14). In the embodiment depicted in FIGS. 14 and 15a to 15c, the gripping mechanism 140 comprises a bar 144 and turning elements 146 (such as two turning elements 146), which turning elements 146 are depicted in greater detail in FIGS. 15a to 15c. Each turning element 146 comprises a locking element 1462 that is rotatable around a rotation axis. The locking element 1462 is non-symmetrical. More particularly, when viewed along the rotation axis, the locking element 1462 may have a first extension in a first direction and a second extension in a section direction, which second direction is perpendicular to the first direction. These extensions may be different. More particularly, the first extension may be at least 110%, preferably at least 150% of the second extension. For example, when viewed along the axis of rotation, the locking element 1462 may be rectangular.

Figure 14:
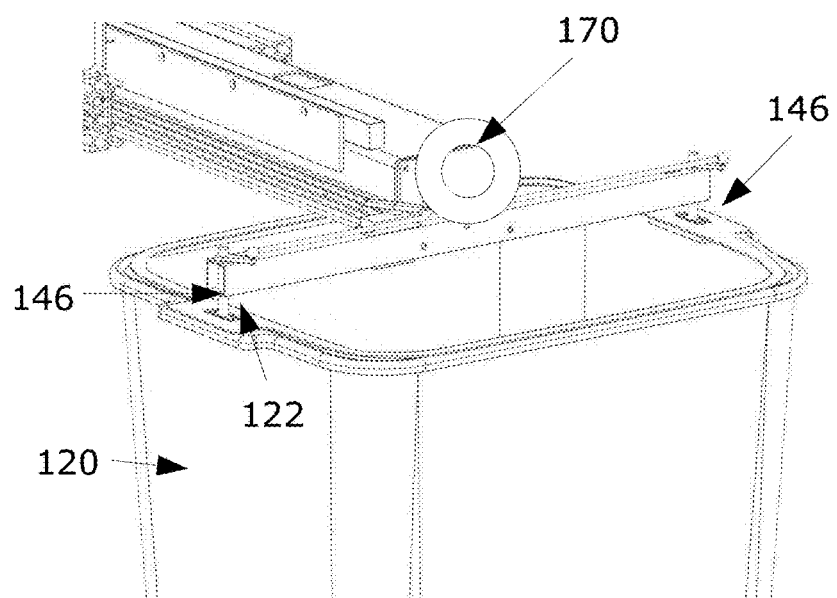
Figure 15A:
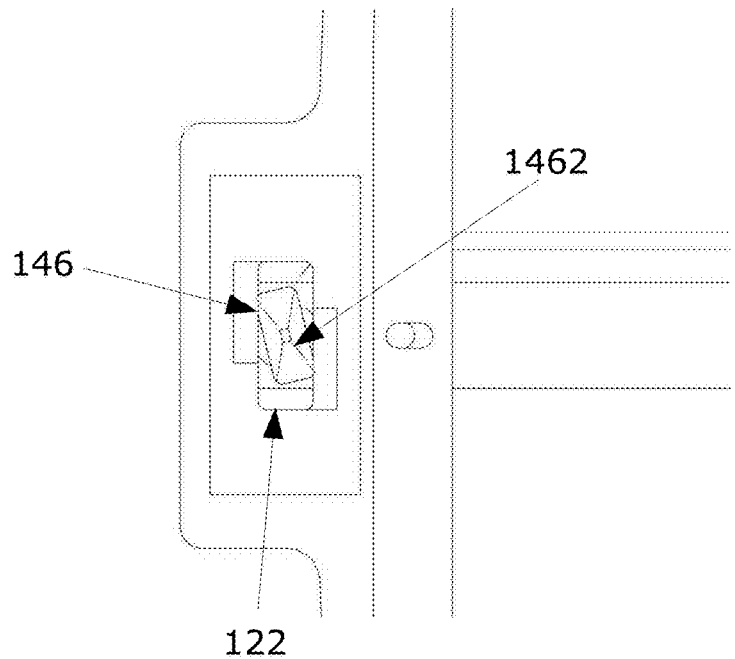
Figure 15B:
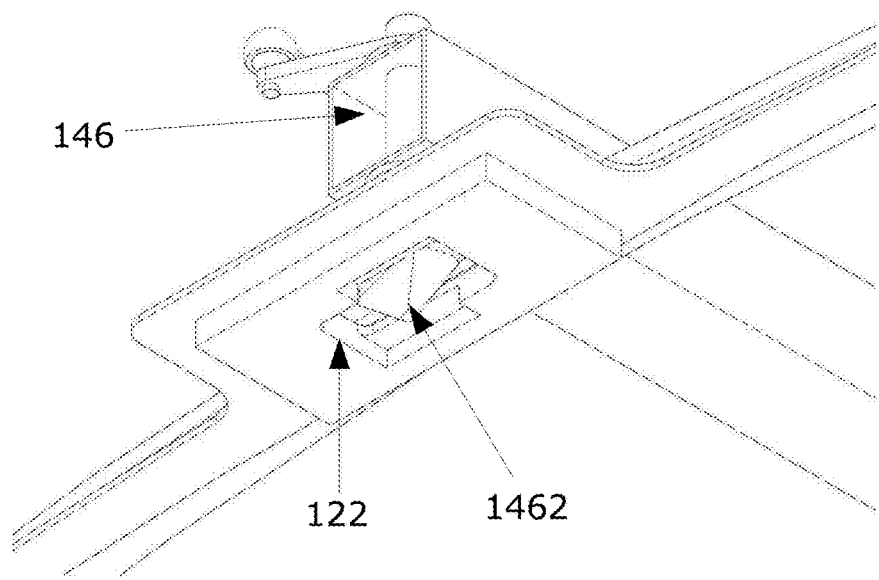
Figure 15C:
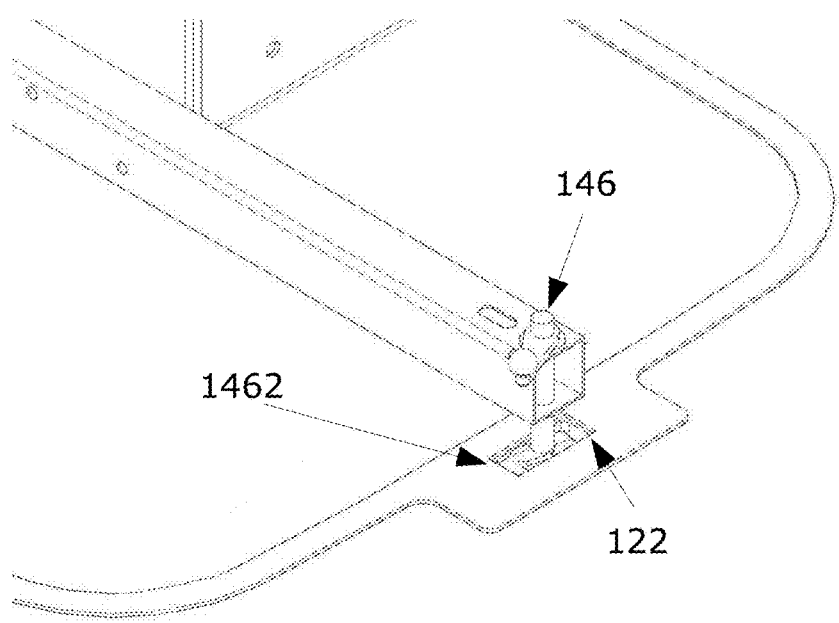
Figure 16:
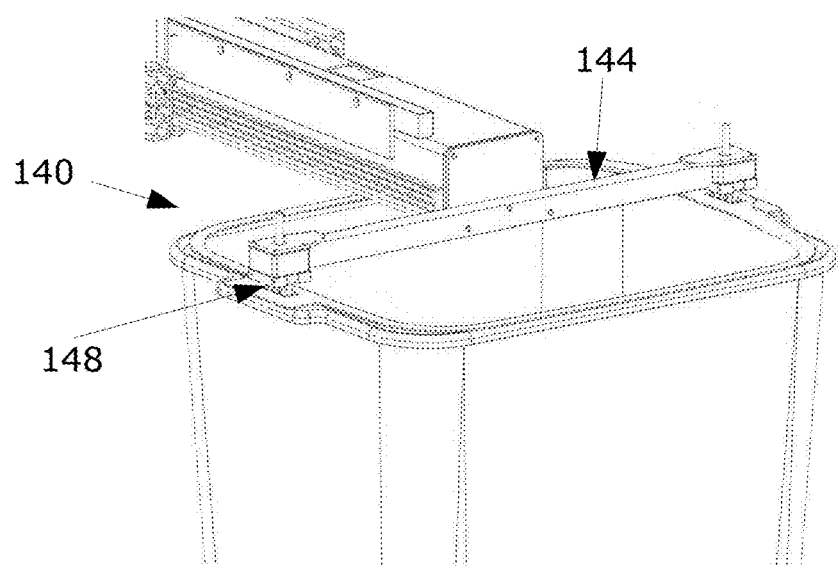

A box 120 to be used with such a gripping mechanism 140 may comprise cut outs 122 (see FIGS. 14 and 15*a* to 15*c*). The cut outs 122 and the locking element 1462 may be configured (e.g., sized and shaped) such that the locking element 1462 fits through the cut outs 122 in a first configuration ("unlocked configuration"), but does not fit through the cut outs 122 in a second configuration ("locked configuration") in which the locking element 1462 is rotated in a horizontal plane, relative to the first configuration. With particular reference to FIG. 14, it will be understood that the gripping mechanism 140 may be brought to the first, unlocked configuration where the locking elements 1462 fit through the cut outs 122 provided on opposite ends of the box 120 and the locking elements 1462 may be guided through the cut outs 122 in this configuration. Once extending through the cut outs 122, the locking elements 1462 may be brought to the second, locked configuration not allowing them to fit through the cut outs 122 (that is the configuration depicted in FIG. 15*a*). It will be understood that the box 120 may be raised and moved when the gripping element 140 assumes this second, locked configuration. Once the box 120 has been brought to the desired location, the locking elements 1462 may again be brought to the first, unlocked configuration allowing them to fit through the cut outs 122. When the gripping element 140 is raised in this configuration, the box 120 is released.

Figure 17A:
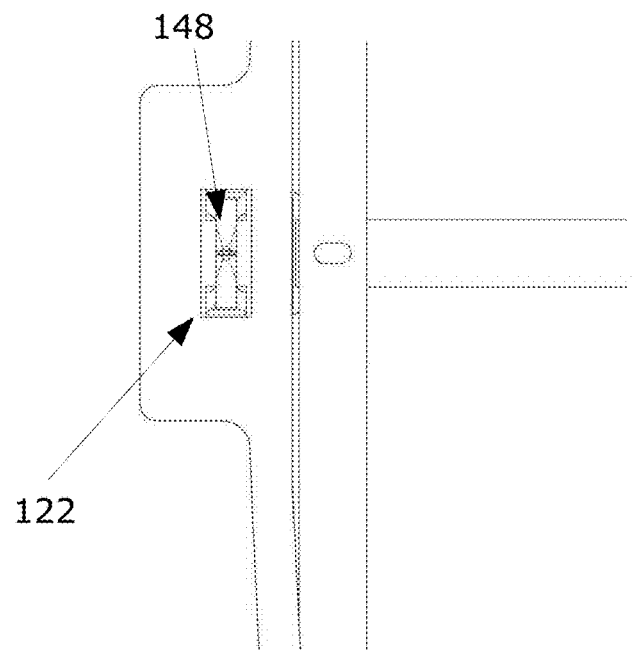
Figure 17B:
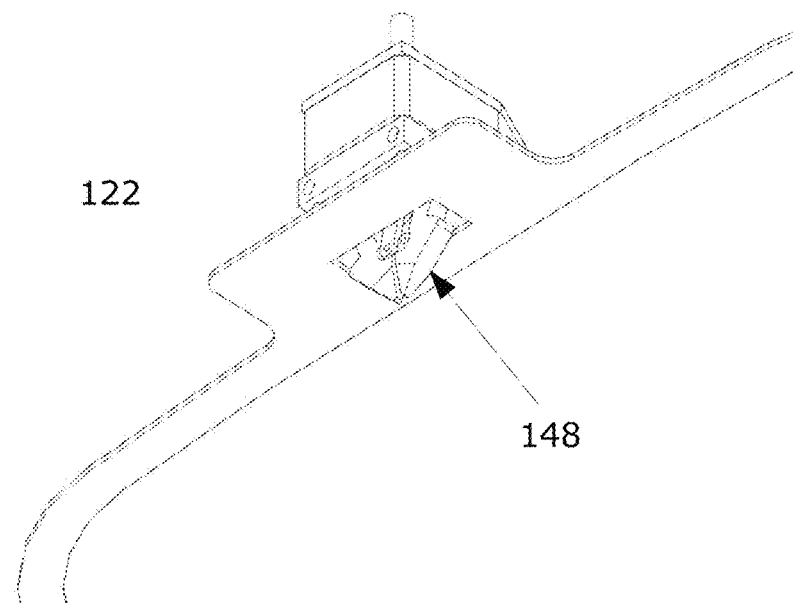
Figure 17C:
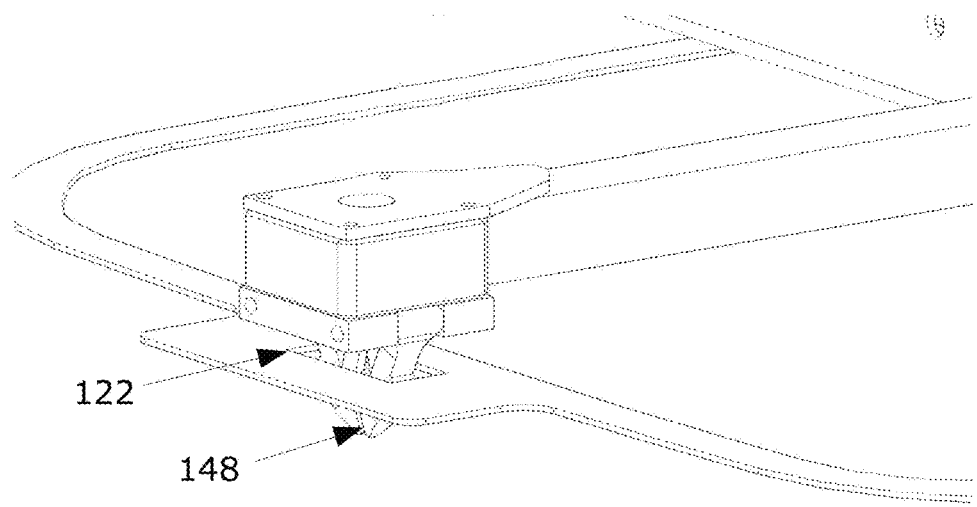

FIGS. 16 and 17*a* to 17*c* depict a further embodiment of a gripping mechanism 140. Again, the gripping mechanism 140 comprises a bar 144 and pincer-type gripper devices 148 (seen in further detail in FIGS. 17*a* to 17*c*). The pincer-type gripper devices 148 may be adapted to grip an object (such as a box 120) similar to a pincer gripping elements, that is, by two opposing parts being brought closer to one another. It will be understood that also this gripping mechanism 140 allows objects to be gripped and released. FIG. 17*a* shows the analogous view to FIG. 15*a*, with the pincer-type gripper devices 148 used. The cut outs 122 can also be shaped differently for this different version of the gripper devices 148.

The gripping mechanism 140 and the loading robot 130 can also be realized in different ways. For example, the loading robot 130 can comprise a 7 axis robot configured to pick up individual items and load them into delivery robots 2. In such embodiments, the gripping mechanism 140 can comprise a mechanical arm or a similar mechanism.

Figure 6:
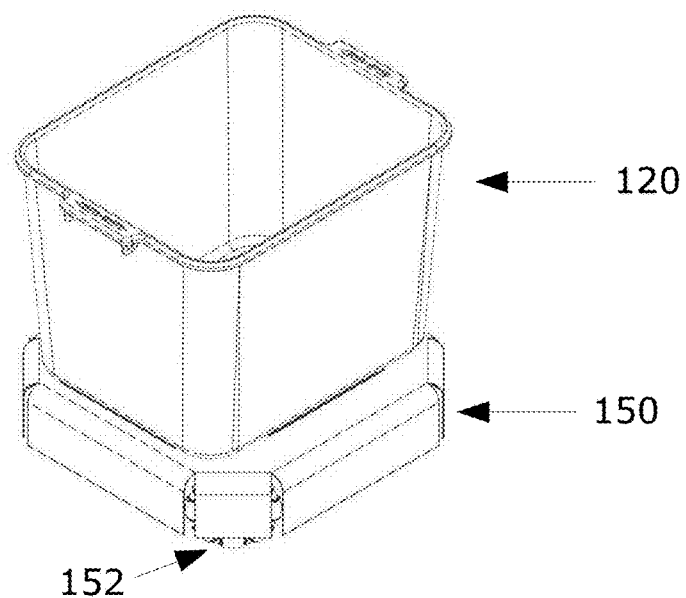
FIGS. 6 and 7 depict a shuffle robot with a box employed in embodiments of the present invention.
Figure 7:
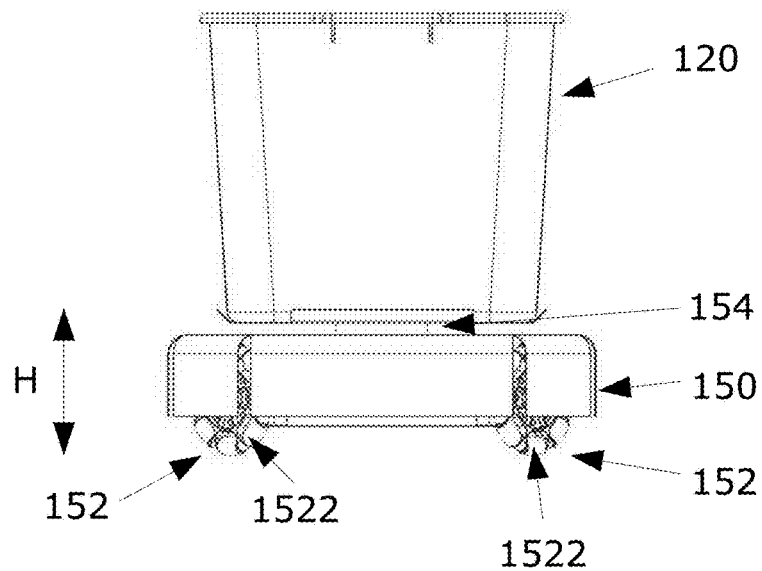
Figure 9:
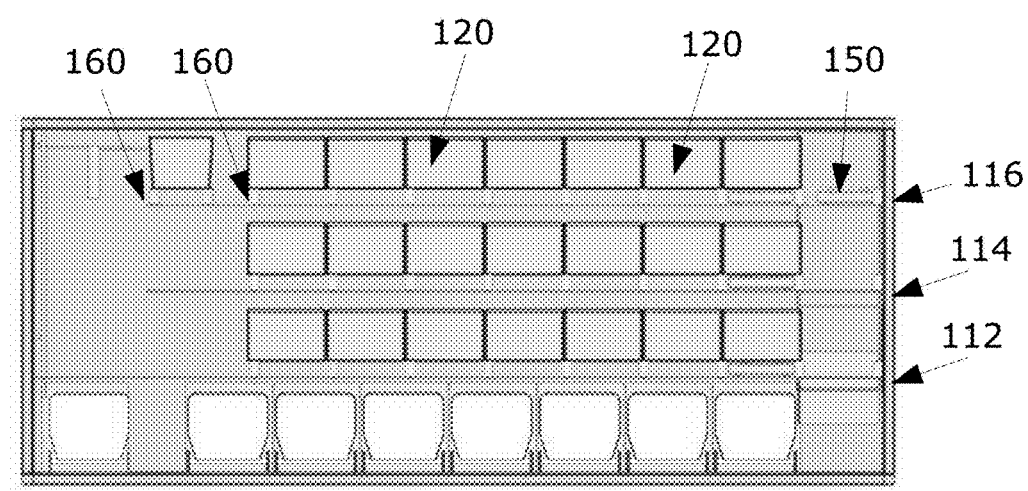

Again with reference to FIG. 2, it will be understood that the loading robot 130 can grip box 120' and load it into robot 2. However, it will also be understood that there may be boxes that are so far removed from the loading robot 130 that the gripper 140 cannot reach them, either because the gripper 140 cannot extend to the desired box 120 or because there are other intervening boxes 120 between the gripper 140 and the desired box 120. For example, with reference to FIG. 2, the boxes in the last row on level 116, i.e., in the row furthest removed from the loading robot 130, cannot, in the configuration in FIG. 2, be gripped by the loading robot 130. To also be able to put these boxes in the delivery robot 2, the storage system 100 is adapted to change the location of the boxes on the storage levels. For example, there may be provided pusher elements pushing complete "rows" or "columns" of boxes. Furthermore, there may be provided driven roller elements or conveyor belts on the storage levels for changing the location of the boxes. In the embodiment depicted, e.g., in FIG. 9, there is provided at least one shuffle robot 150 to move the boxes on the storage levels. One embodiment of an exemplary shuffle robot 150 (together with a box 120) is depicted in FIGS. 6 and 7.

Generally, the shuffle robot 150 is adapted to change the horizontal position of the boxes 120 located on a given one of the storage levels 112, 114, 116. One role of the shuffle robot is to bring a given box 120 to a pre-loading location in which the box 120 is accessible to the loading robot 130. In the depicted embodiment, the shuffle robot 150 is a freely moving robot, i.e., a robot that may reach any location and is not limited in its movement, e.g., by rails (as is the above discussed loading robot 130). More particularly, the shuffle robot 150 comprises a plurality of wheels 152, for example, four wheels 152. Furthermore, it may comprise an actuator 154 adapted to be lowered and raised between a retracted position and one or more extended position. In the retracted position of the actuator, the shuffle robot 150 may have a first height H of 250 to 10 mm, such as 150 to 50 mm, and more preferably 130 to 75 mm. In the extended position of the actuator, the shuffle robot 150 may have a second height H of 300 to 15 mm, such as 200 to 60 mm, and more preferably 140 to 85 mm. The difference between the first height and the second height may be in the range of 5 mm to 100 mm, and preferably in the range of 10 mm to 50 mm.

The shuffle robot 150 can also comprise sensors that can detect the shuffle robot's environment. For example, the shuffle robot 150 can comprise sensors that allow it to localize itself within a level 112, 114, 116, 118 and locate the correct box 120. Such sensors may comprise position sensors, visual cameras, ultrasonic sensors, radar sensors, Lidar sensors, time of flight cameras, accelerometers, dead-reckoning sensors and/or further sensors. The shuffle robot 150 can also comprise specific sensors configured to distinguish the boxes 120. For example, the shuffle robot 150 can comprise an RFID reader (with the boxes 120 comprising RFID tags), a QR code reader (with the boxes 120 bearing QR codes) and/or other similar sensors.

Figure 8:
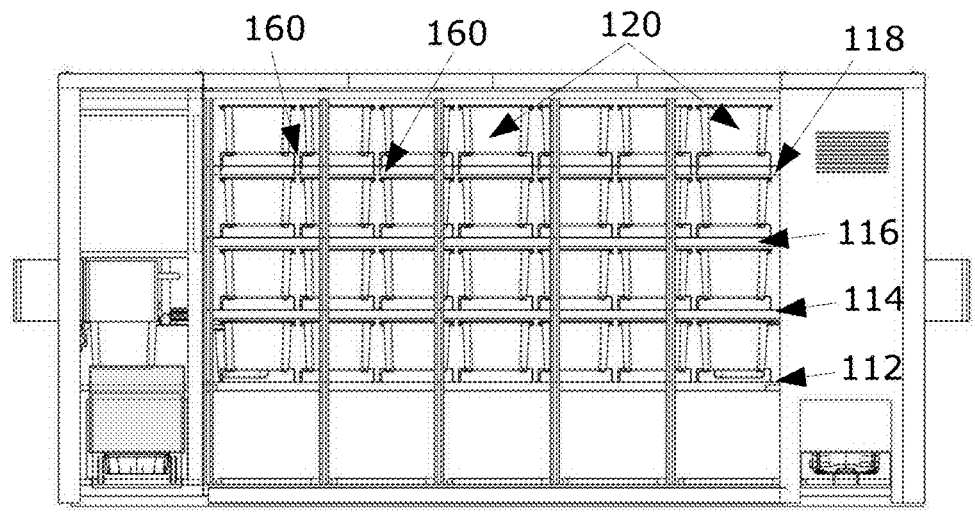
FIGS. 8 and 9 depict side views of storage systems in accordance with embodiments of the present invention.

Again with reference to FIG. 2 (and with further reference to FIGS. 8 and 9), it is noted that the boxes 120 located on the storage levels 112, 114, 116 are supported by supports 160, only some of which supports 160 are marked with the reference numeral 160 for clarity and simplicity of illustration. The supports 160 support the boxes 120 in such a way that a portion, but not all, of the bottom section of each box 120 is supported. In particular, the supports 160 allow the actuator 154 of the shuffle robot 150 to lift the box 120 from the supports 160 and the shuffle robot 150 to move around the supports.

It will be understood that the height of the supports is larger than the first height H of the shuffle robot 150 in a state where the actuator 154 is retracted, but smaller than the second height H of the shuffle robot 150 in a state where the actuator 154 is extended.

It will be understood that the shuffle robot(s) 150 can thus be used to relocate the boxes 120 on the storage levels 112, 114, 116, 118. More particularly, the shuffle robot 150 (also schematically depicted in FIG. 9) may relocate itself underneath a box 120 in the retracted state, i.e., the shuffle robot 150 may travel to a position underneath the box 120 while being in the retracted state. Once it is positioned underneath the desired box, the shuffle robot 150 may assume an extended configuration, thereby lifting off the box 120 from the supports 160. It may thus transport the box 120 "piggyback". In this configuration, it can change the position of the box 120. Again with reference to FIG. 2, in particular, the shuffle robot 150 can bring the box 120 to a pre-loading location where the box, or at least an item contained therein, can be reached by the loading robot 130.

While the boxes 120 being supported on such supports 160 is one embodiment, the person skilled in the art will understand that other embodiments are also possible. For example, the boxes 120 may also be suspended, or they may be supported from the sides.

Again with reference to FIG. 7, it will be noted that the wheels 152 may be realized as omni wheels, poly wheels or mecanum wheels. That is, each wheel 152 may be rotatable around a wheel's principal axis of rotation. Furthermore, each wheel 152 may additionally comprise rotatable sections 1522 and each such rotatable section 1522 may be rotatable around an axis of rotation different from the principle axis of rotation of the respective wheel 152. It will be understood that with such wheels 152, the shuffle robot 150 may move completely freely in any direction without having a turning radius, i.e., with a "zero turn radius". This may simplify the operation of the system 100 and make it more efficient.

Figure 10:
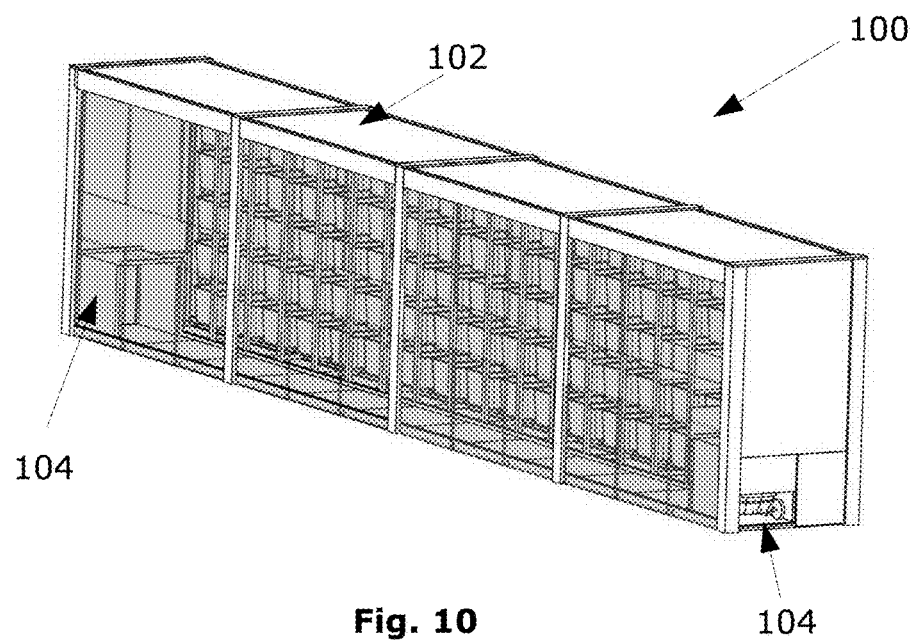
FIGS. 10 and 11 depict perspective views of a storage system in accordance with an embodiment of the present invention.

With reference to FIG. 1 again, the housing 102 of the storage system 100 may include at least one port 104 (which may also be referred to as opening or access point), through which the delivery robot 2 may enter into and exit the storage system 100. In a preferred embodiment the port 104 permits the delivery robot to enter within a footprint of the storage system 100, e.g., within a minimum bounding rectangle of the storage system 100 in a top view thereof. It will further be understood that in some embodiments, there may be two ports 104, such that one port 104 (the "entry port") is used by the delivery robots 2 for entering and the other port 104 (the "exit port') is used for exiting. This may enhance the efficiency, as the delivery robots 2 can then be guided through the storage system 100 in the same direction (instead of entering and exiting in opposite directions). It will further be understood that the port 104 (or the ports 104) may be closable, thereby limiting the access to the storage system 100. Such a configuration with two ports for the delivery robots 2 is exemplarily depicted in FIG. 10.

Figure 11:
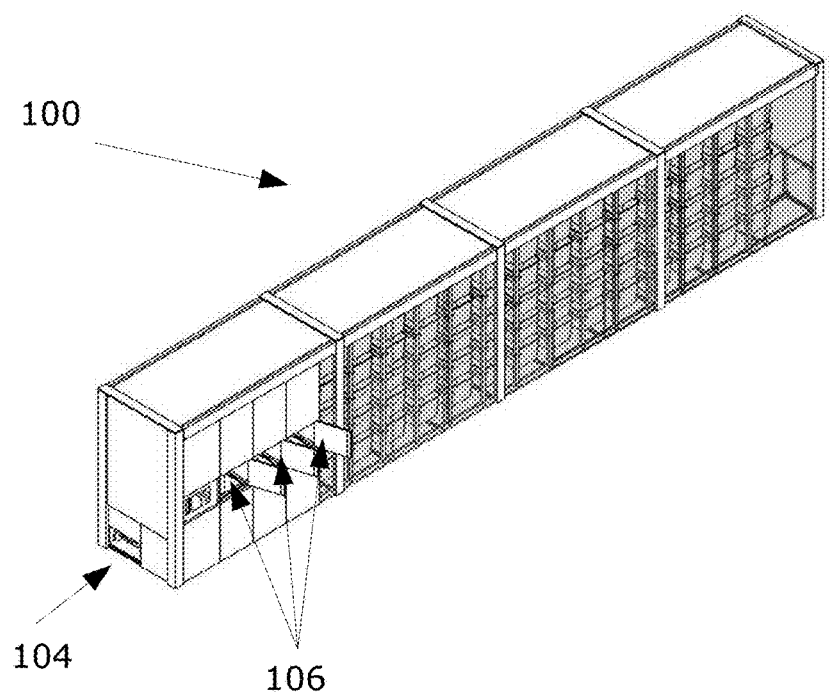
Figure 12:
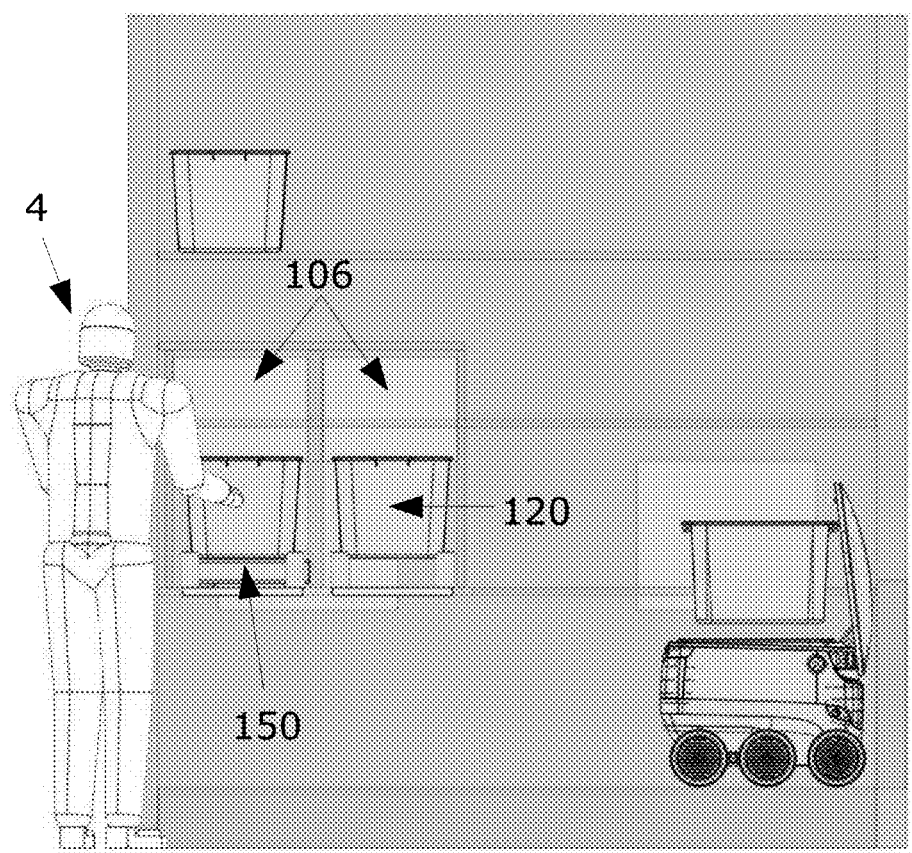
FIG. 12 depicts a partial side view of a storage system in accordance with an embodiment of the present invention.

Reference will now be made to the embodiment depicted in FIG. 11. In addition to components already discussed, this embodiment comprises a plurality of supply compartments 106 (though it is noted that in some embodiments, only one supply compartment 106 may be provided). The supply compartment 106 may comprise a door allowing restricted access to the supply compartment 106. The supply compartment 106 may be used as depicted in FIG. 12. In particular, it may be used to supply items into the boxes 120 and/or to supply boxes 120 to the storage system 100. That is, in one scenario, where items are to be supplied to the storage system 100, the discussed shuffle robot 150 may bring a box 120 to a supply compartment 106. The door of the supply compartment 106 may then be opened (either automatically or manually). Once the door is open, a user 4 may place the items into the respective box 120 in the supply compartment 106. The door may then close. Thus, by means of the supply compartments 106, items may be supplied to the storage system 100.

Figure 18:
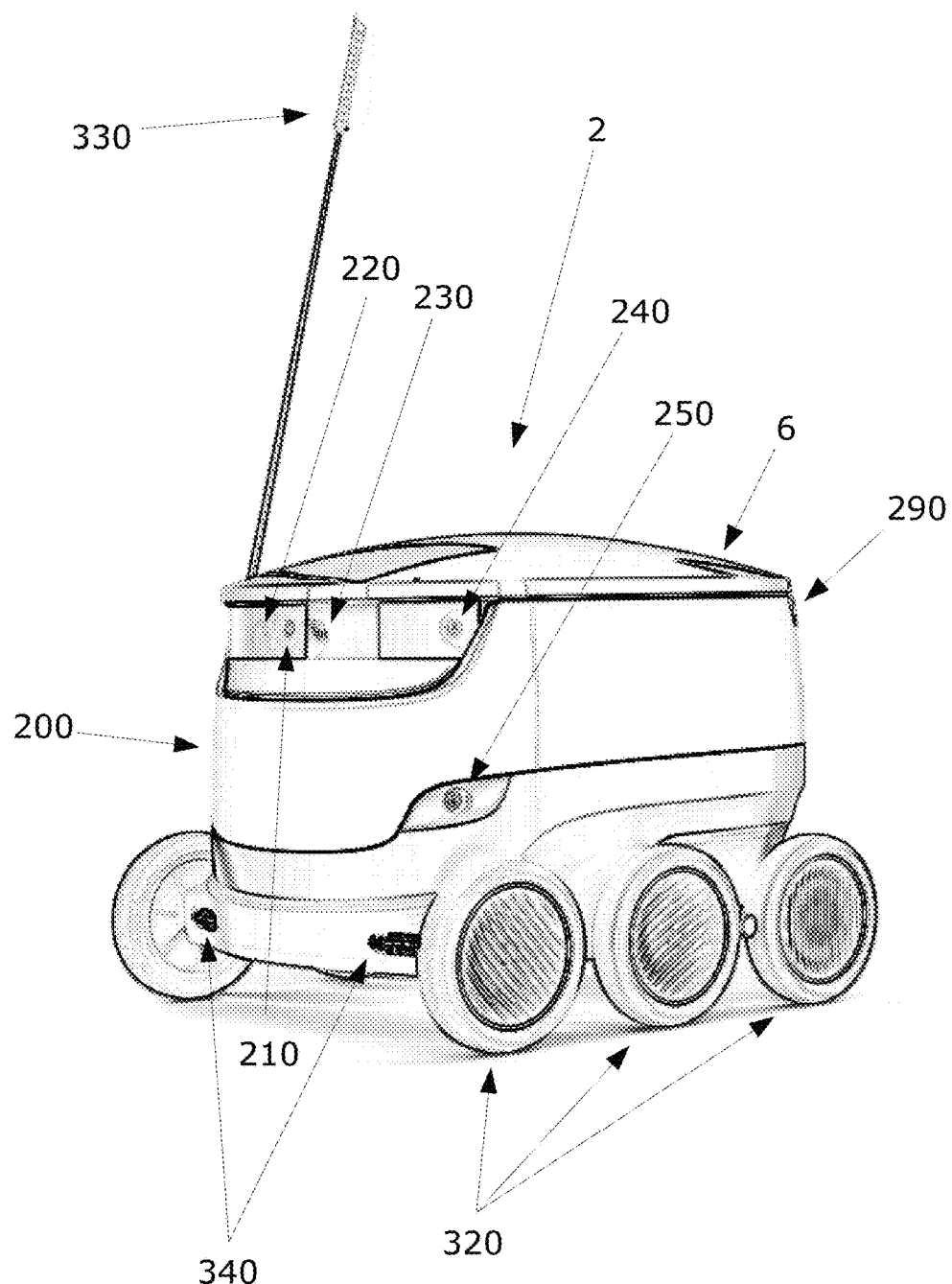
FIG. 18 depicts an embodiment of a delivery robot configured to be loaded by the storage system.

FIG. 18 depicts an embodiment of a delivery robot 2 that can be loaded by the storage system 100. The delivery robot 2 comprises a body 200. The body 200 comprises an item compartment into which items loaded by the storage system 100 can be transported.

The mobile robot 2 further comprises a motion component 320 (depicted as wheels 320). In the present embodiment, the motion component 320 comprises six wheels 320. This can be particularly advantageous for the mobile robot 2 when traversing curbstones or other similar obstacles on the way to delivery recipients. In other embodiments, the motion component can comprise rollers, tracks or other structures.

The mobile robot 2 further comprises a flagpole or stick 330 used to increase the visibility of the robot. Particularly, the visibility of the robot during road crossings can be increased. In some embodiments, the flagpole 330 can comprise an antenna. The mobile robot 2 further comprises robot headlights 340 configured to facilitate the robot's navigation in reduced natural light scenarios and/or increase the robot's visibility further. The headlights are schematically depicted as two symmetric lights 340, but can comprise one light, a plurality of lights arranges differently and other similar arrangements.

The mobile robot 2 also comprises sensors 210, 220, 230, 240, 250, and 290. The sensors are depicted as visual cameras in the figure, but can also comprise radar sensors, ultrasonic sensors, Lidar sensors, time of flight cameras and/or other sensors. Further sensors can also be present on the mobile robot 2. One sensor can comprise a front camera 210. The front camera 210 can be generally forward facing. The sensors may also comprise front, side and/or back stereo cameras 220, 230, 240, 250, 290. The front stereo cameras 220 and 230 can be slightly downward facing. The side stereo cameras 240 and 250 can be forward-sideways facing. There can be analogous side stereo cameras on the other side of the robot (not shown in the figure). The back stereo camera 290 can be generally backward facing. The sensors present on multiple sides of the robot can contribute to its situational awareness. That is, the robot 2 can be configured to detect approaching objects and/or hazardous moving objects from a plurality of sides and act accordingly.

The sensors can also allow the robot to navigate and travel to its destinations at least partially autonomously. That is, the robot can be configured to map its surroundings, localize itself on such a map and navigate towards different destinations using in part the input received from the multiple sensors. The sensors can also allow the delivery robot 2 to enter the storage system 100, to stop at a loading position and to exit the storage system 100 after being loaded. That is, the mobile robot 2 may be configured to operate in an unstructured outdoor environment and may, in particular, be configured to operate on sidewalks.

It is understood that the robot is provisioned with a controller configured to govern operation of the robot, and also with an onboard communication component to wirelessly send and/or receive instructions, data, status information, images, etc.

Figure 19:
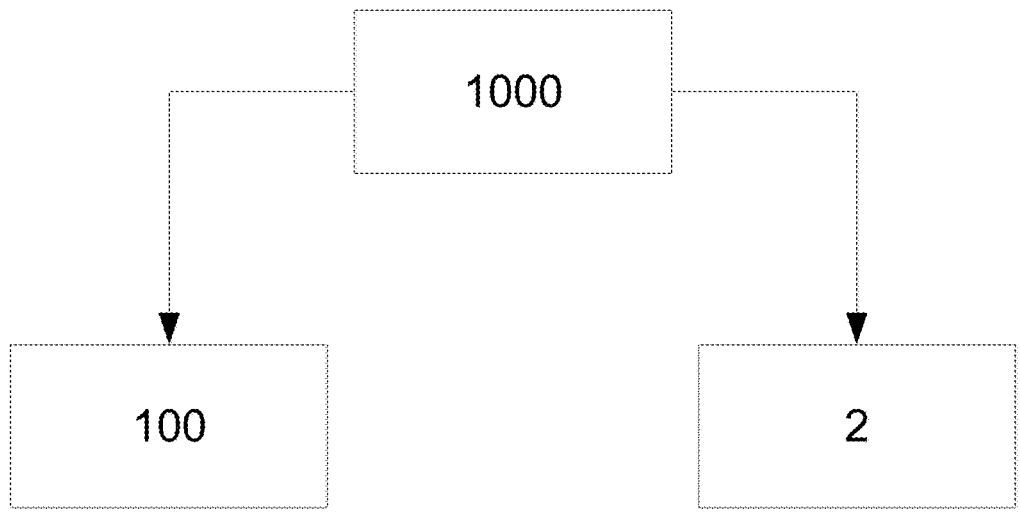
FIG. 19 schematically depicts the communication and control of the storage system and the delivery robot.

FIG. 19 schematically depicts communication and coordination of the storage system 100 and the robot 2. Controller 1000 is schematically shown in the figure. The controller 1000 can comprise a local and/or a remote server or a collection of servers. The controller 1000 can coordinate the functioning of the storage system 100. For example, the controller 1000 may receive a communication from a delivery robot 2 that it has approached the storage system 100. In response, the controller 1000 then opens the entry port 104 so that the delivery robot 2 can enter the storage system 100. The controller 1000 may also then command the loading robot 130 to load the delivery robot 2 with the items that it should be loaded with. The controller 1000 may comprise a communication component (for example, to communicate with the delivery robots 2) and a memory component. The memory component of the controller 1000 may include a database comprising records for each delivery item. For example, a record may include data related to the identity of the items and its location in the storage system 100, as well as its identifying tags such as RFID and QR or other codes. The records can also comprise information related to the destination of the different items. The controller 1000 can then determine which delivery robot 2 should be loaded with which items at which time. The controller 1000 can also generally coordinate the operation of the storage system 100, such as keeping track of the available storage space, delivery dates and times, any maintenance and repairs and perform other tasks related to the running of the storage system 100. The controller 1000 can be located within the storage system 100 as a local CPU or a similar component, or it can be a remote controller 1000 communicating its commands to the storage system 100 or receiving transmissions from it via a communication component.

That is, in general terms, the controller 1000 may communicate with the robots 2 and the with the storage system 100. For instance, when a robot 2 approaches the system 100, this may be communicated from the robot 2 to the controller 1000, and the controller may then instruct the system 100 to open the port 104 to allow the robot 2 to enter the system 100. The robot 2 may then autonomously travel to the vicinity of the loading robot 130, i.e., to a designated location where the loading robot 130 may reach into the delivery robot 2. When a robot 2 enters the storage system 100, it is usually empty, as it has just performed a delivery. That is, it may only carry an empty basket or box 120. Once the delivery robot 2 is located in the vicinity of the loading robot 120, the controller 1000 may instruct the loading robot 130 to grip the empty basket (also referred to as box 120) in the delivery robot 2 and to place it onto one of the storage levels 112, 114, 116, 118. More particularly, the controller 1000 may determine where the box 120 is to be placed. Furthermore, the controller 1000 may also control the operation of the shuffle robot(s) 150. That is, it may also control where the empty box 120 that has just be taken from the delivery robot 2 is to be placed on the storage level by a shuffle robot 150.

Further still, the controller 1000 further determines which box 120 (or, more generally, which item) is next loaded into the delivery robot 2. To do so, the controller 1000 may access a memory component. The memory component may store information relating to different details, including, e.g., which items are presently in the storage system, where the items need to be delivered to, and when the items need to be delivered. Depending on any (or all) of these aspects, the controller 1000 may determine which item or box 120 is to loaded into the delivery robot 2 next. If this determination is done, the controller 1000 may instruct the shuffle robot 150 to bring this item/box 120 to a pre-loading location where it can be reached by the loading robot 130. Further, the controller 1000 may then also instruct the loading robot 130 to grip this box/item 120 and to load it into the delivery robot 2.

Further still, the controller 1000 may also send delivery information (relating to the delivery address) to the delivery robot 2, which may then navigate autonomously (i.e., without the help of a human operator) or semi-autonomously (i.e., with a human operator assisting only in certain instances, such as, when crossing a road) to the delivery address and deliver the item there.

One way of operation of the storage system 100 will now be described. As will be understood, the storage system 100 may be used for temporarily storing items to be transported to recipients. That is, instead of a van going all the way to the recipient, one storage system 100 may be used as a hub to serve as the distribution center for a plurality of recipients, such as for the recipients in a defined area (e.g., a neighborhood, a subdivision or, say, an area of 1 $(km)^2$). A van may bring all the items for this area to the storage system 100. Here, the items may be unloaded or transferred to the storage system 100. In particular, the shuffle robot 150 may bring the boxes 120 to be loaded to the supply compartments 106 and a user may supply these boxes 120 with items. Once loaded with items, the shuffle robot 150 may move the boxes 120 away from the supply compartment 106. Each box 120 may then be brought to a waiting position or storage position in the storage system 100. In case the box 120 is already located on the intended storage level 112, 114, 116, 118, the shuffle robot 150 may simply bring the box 120 to a storage position on this level 112, 114, 116, 118. In case it is desirable that the box 120 is stored on another storage level, the box 120 is brought into reach of the loading robot 130, and the loading robot 130 brings the box to the other storage level. Once it arrives at this other storage level, a shuffle robot 150 on this level may be used to bring the box 120 to its storage position.

For the sake of completeness, it is noted that the loading robot 130 may also be used to bring a shuffle robot 150 from one storage level to another. In the foregoing, it has been described how items may be input into the storage system 100.

However, in alternative embodiments, the shuffle robots 150 may also be used to bring items from a van to the storage system 100. In such embodiments, a van equipped with items may park close to the storage system 100, and the shuffle robot 2 may travel to the van, unload items from the van and bring the items (e.g., boxes) into the storage system 100.

Furthermore, the storage system 100 may also be used to equip a delivery robot 2 with items. A typical scenario is that a delivery robot 2 comes to the storage system 100 after having performed a delivery. In such a scenario, the delivery robot 2 is typically equipped with an empty box 120. The delivery robot 2 may enter the storage system 100 through an entry port 104. It then travels to a designated location where it can be reached by the loading robot 130. The gripping mechanism 140 of the loading robot 130 is then used to grip the empty box located in the delivery robot 2 and to bring it to a storage level 112, 114, 116, 118. Here, it may be relocated by means of a respective shuffle robot 150. For example, the empty box 120 may be brought to a supply compartment 106 to be later supplied with another item to be delivered.

When the item to be presently delivered is determined, a shuffle robot 150 travels underneath the box 120 housing the item, lifts the box 120 and transports it to the vicinity of the loading robot 130 (i.e., to a pre-loading location where it can be gripped by the loading robot 130). The loading robot 130 then grips the box 120 and places it into the delivery robot 2. The delivery robot 2 may then leave the storage system 100 through an exit port 104 and deliver the item to the recipient.

In some embodiments, each storage level 112, 114, 116, 118 may have a dedicated shuffle robot 150 assigned to that level only. It is further understood that shuffle robots on various levels may operate independently of one another. Thus, the storage system 100 is configured such that boxes 120 on different storage levels 112, 114, 116, 118 may move simultaneously. Consequently, while a box 120 on one storage level moves towards that storage level's pre-loading location where it can be accessed by a loading robot 130, a box on a different storage level may simultaneously move towards its corresponding pre-loading location.

In another embodiment, the storage system 100 can be mobile. That is, the storage system 100 can comprise wheels 190 and be adapted to move autonomously, semi-autonomously, be driven by a driver or even be wheeled (loaded) onto a vehicle, such as a truck, and then be driven by a driver. Such a storage system 100 can be loaded with delivery items when the system is located in a loading area, such as at a large depot, and then transported to a delivery area where the items are to be delivered. One or more delivery robots (2) occupying the delivery robot level (110) may also be transported at this time. Upon arriving at the delivery area, the one or more delivery robots 2 can proceed to deliver the items from the storage system 100 to the respective recipients.

Once all of the items have been delivered and/or other conditions are fulfilled (such as a particular time interval), the delivery robots (2) reenter the vehicle and once again occupy the delivery robot level (110). The vehicle with the storage system (100) can depart the delivery area and move to another delivery area or go to a depot to be loaded with further items for delivery.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A storage system (100) adapted to store a plurality of items and to load a delivery robot (2) with any one of said plurality of items for delivery to a destination, wherein the storage system (100) comprises:
  a delivery robot level (110),
  at least one storage level (112, 114, 116, 118) for storing the items, the at least one storage level being different from the delivery robot level (110), and
  a loading robot (130) adapted to retrieve a given item from a storage level (112, 114, 116, 118) and then load the retrieved item to a delivery robot (2) located on the delivery robot level (110),
  wherein the storage system (100) is adapted to move the given item within said storage level (112, 114, 116, 118) towards a pre-loading location in which the given item is accessible to the loading robot (130);
  wherein the loading robot (130) comprises a base (130*a*), a vertically extending body (130*b*) connected to the base (130*a*), and a gripping mechanism (140) extending outwardly from the vertically extending body and having at least two orthogonal axes of movement;
  wherein the delivery robot (2) is a mobile delivery robot comprising a motion component (320); and
  wherein the delivery robot (2) is configured to operate in an outdoor environment and deliver the retrieved item to a delivery recipient at a delivery address.

2. The storage system (100) according to claim 1, wherein the storage system (100) comprises a plurality of storage levels (112, 114, 116, 118) for storing items.

3. The storage system (100) according to claim 2, wherein:
  the delivery robot level (110) is a ground level; and
  all of said plurality of storage levels (112, 114, 116) are above the delivery robot level.

4. The storage system (100) according to claim 3, comprising only a single delivery robot level (110).

5. The storage system (100) according to claim 1, further comprising at least one port (104) through which the delivery robot (2) enters and/or exits the storage system (100).

6. The storage system (100) according to claim 5, comprising:
  an entry port (104) through which the delivery robot (2) enters the storage system (100) to be loaded with an item for delivery; and
  an exit port (104) through which the delivery robot (2) exits the storage system (100) after being loaded with said item for delivery, the exit port (104) being separate from the entry port (104).

7. The storage system (100) according to claim 5, wherein, after entering through the port (104), the delivery robot is located within a footprint of the storage system (100).

8. The storage system (100) according to claim 1, wherein the loading robot (130) comprises three axes of movement (132, 134, 136).

9. The storage system (100) according to claim 8, wherein:
  the storage system (100) comprises a sensor (170) for sensing a location of an object to be gripped by the gripping mechanism (140), and
  the sensor (170) is mounted on the loading robot (130).

10. The storage system (100) according to claim 1, wherein:
  the loading robot (130) is adapted to grip the given item and load the gripped item to the delivery robot (2).

11. The storage system (100) according to claim 1, wherein:
  the items are stored in boxes (120);
  the loading robot (130) is adapted to grip a box (120) and load the gripped box (120) to the delivery robot (2); and
  the storage system (100) is adapted to move any one of the boxes (120) within a storage level (112, 114, 116, 118) towards said pre-loading location, such that said box is accessible to the loading robot (130).

12. The storage system (100) according to claim 1, further comprising at least one shuffle robot (150) adapted to move an object within a storage level (112, 114, 116, 118) to said pre-loading location, such that the object is accessible to the loading robot (130).

13. The storage system (100) according to claim 12, wherein:
the items are stored in boxes (120);
the at least one storage level (112, 114, 116, 118) comprises a plurality of supports (160) for supporting the boxes (120);
the shuffle robot (150) comprises an actuator (154) that is adapted to assume a retracted configuration and an extended configuration for lifting a box (120); and
the shuffle robot (150) has a first height in the retracted configuration and a second height in the extended configuration, the first height being smaller than a height of the supports (160) and the second height being greater than the height of the supports (160), and a difference between the second height and the first height is in the range of 5 mm to 100 mm.

14. The storage system (100) according to claim 1, comprising:
a plurality of storage levels (112, 114, 116, 118) for storing items;
at least one shuffle robot (150) adapted to move an object within a storage level (112, 114, 116, 118) to said pre-loading location;
an entry port (104) through which the delivery robot (2) enters the storage system (100) to be loaded with an item for delivery; and
an exit port (104) through which the delivery robot (2) exits the storage system (100) after being loaded with said item for delivery, the exit port (104) being separate from the entry port (104).

15. The storage system (100) according to claim 14, wherein the loading robot (130) comprises:
three axes of movement (132, 134, 136); and
a sensor (170) for sensing a location of an object to be gripped by the gripping mechanism (140).

16. The storage system (100) according to claim 15, wherein:
the items are stored in boxes (120);
the loading robot (130) is adapted to grip a box (120) and load the gripped box (120) to the delivery robot (2).

17. The storage system (100) according to claim 16, wherein:
the loading robot (130) is configured to grip and release the shuffle robot (150) to bring the shuffle robot (150) from one storage level to another, when the shuffle robot initially is in the pre-loading location of said one storage level.

18. The storage system (100) according to claim 1, further comprising wheels to facilitate transporting the storage system from a loading area where the storage system is loaded with items for delivery, to a delivery area where the items are to be delivered.

19. The storage system (100) according to claim 1, wherein:
the delivery robot level (110) is a ground level; and
the at least one storage level (112, 114, 116) is above the delivery robot level.

20. The storage system (100) according to claim 19, comprising only a single delivery robot level (110).

21. The storage system (100) according to claim 1, wherein:
the delivery robot level (110) and the at least one storage level (112, 114, 116) are located within a housing (102), with the delivery robot level (110) being below the at least one storage level (112, 114, 116, 118);
the housing has at least one port (104) through which the delivery robot (2) is configured to enter within a footprint of the housing (102) at the delivery robot level (110) to be loaded with the retrieved item by the loading robot (130); and
the delivery robot (12) is configured to leave the footprint of the housing to deliver the retrieved item to the delivery recipient at the delivery address.

22. The storage system according to claim 21, wherein:
a plurality of delivery robots (2) are housed on the delivery robot level (110), under the at least one storage level (112, 114, 116, 118).

23. The storage system according to claim 21, wherein:
the loading robot (130) is a vertical loading robot configured to move items vertically; and
the loading robot (130) remains in position relative to the housing (102).

24. The storage system according to claim 1, wherein the delivery robot (2) comprises:
a body (200) having an item compartment into which the retrieved item is loaded;
a flagpole (330) to increase the visibility of the delivery robot (2); and
a plurality of cameras, including front stereo cameras (220, 230), side stereo cameras (240, 250), and back stereo cameras (290) that are generally backward facing.

25. A storage and transport system comprising, in combination:
the storage system (100) according to claim 18;
a vehicle into which said storage system is loaded for transport to a delivery area; and
at least one additional delivery robot (2) also loaded onto the vehicle, for performing deliveries when the vehicle arrives at the delivery area.

26. The storage and transport system according to claim 25, wherein:
the plurality of delivery robots (2) are also loaded onto the vehicle and are located within a footprint of the storage system (100).

27. The storage and transport system according to claim 25, wherein the vehicle is a truck allowed on roads.

28. A method of loading an item to a delivery robot (2), the item being located on a storage level of a storage system according to claim 1, the method comprising:
the delivery robot (2) entering the storage system (100) and traveling to a designated location on the delivery robot level where the delivery robot is positioned to be loaded by the loading robot (130);
moving the item within the storage level, to a pre-loading location in which the item is accessible to the loading robot (130);
retrieving the item from said pre-loading location with the loading robot (130) and loading the delivery robot (2) with the retrieved item; and
the delivery robot (2) leaving the designated location and exiting the storage system (100).

29. The method according to claim 28, wherein:
the item is located in a box which is supported by supports; and
moving the item within the storage level comprises lifting the box off of the supports, and transporting the lifted box to the pre-loading location.

30. The method according to claim 29, comprising:
bringing a shuffle robot underneath the box prior to lifting the box, the shuffle robot having a retracted configuration and an extended configuration; wherein:
the shuffle robot is brought underneath the box, when the shuffle robot is in the retracted configuration, and the shuffle robot transports the box to the pre-loading position, when the shuffle robot is in the extended position.

31. A storage system (100) adapted to store a plurality of items and to load a delivery robot (2) with any one of said plurality of items for delivery to a destination, wherein the storage system (100) comprises:
   a delivery robot level (110);
   at least one storage level (112, 114, 116, 118) for storing the items, the at least one storage level being different from the delivery robot level (110); and
   a loading robot (130) adapted to retrieve a given item from a storage level (112, 114, 116, 118) and then load the retrieved item to a delivery robot (2) located on the delivery robot level (110);
   wherein the storage system (100) is adapted to move the given item within said storage level (112, 114, 116, 118) towards a pre-loading location in which the given item is accessible to the loading robot (130);
   wherein the delivery robot (2) is a mobile delivery robot comprising a motion component (320);
   wherein the delivery robot (2) is configured to operate in an outdoor environment and deliver the retrieved item to a delivery recipient at a delivery address;
   wherein the system further comprises at least one shuffle robot (150) adapted to move an object within a storage level (112, 114, 116, 118) to said pre-loading location, such that the object is accessible to the loading robot (130); and
   the loading robot (130) is configured to grip and release the shuffle robot (150) to bring the shuffle robot (150) from one storage level to another, when the shuffle robot initially is in the pre-loading location of said one storage level.

32. A storage system (100) adapted to store a plurality of items and to load a delivery robot (2) with any one of said plurality of items for delivery to a destination, wherein the storage system (100) comprises:
   a delivery robot level (110),
   at least one storage level (112, 114, 116, 118) for storing the items, the at least one storage level being different from the delivery robot level (110), and
   a loading robot (130) adapted to retrieve a given item from a storage level (112, 114, 116, 118) and then load the retrieved item to a delivery robot (2) located on the delivery robot level (110),
   wherein the storage system (100) is adapted to move the given item within said storage level (112, 114, 116, 118) towards a pre-loading location in which the given item is accessible to the loading robot (130);
   wherein the delivery robot (2) is a mobile delivery robot comprising:
      a motion component (320);
      a body (200) having an item compartment into which the retrieved item is loaded;
      a flagpole (330) to increase the visibility of the delivery robot (2); and
      a plurality of cameras, including front stereo cameras (220, 230), side stereo cameras (240, 250), and back stereo cameras (290) that are generally backward facing; and
   wherein the delivery robot (2) is configured to operate in an outdoor environment and deliver the retrieved item to a delivery recipient at a delivery address.

* * * * *